US00RE46539E

(19) United States
(12) Reissued Patent
Fisher

(10) Patent Number: US RE46,539 E
(45) Date of Reissued Patent: Sep. 5, 2017

(54) ELECTRONIC LOCK BOX PROXIMITY ACCESS CONTROL

(71) Applicant: SentriLock, LLC, Cincinnati, OH (US)

(72) Inventor: Scott R. Fisher, West Chester, OH (US)

(73) Assignee: SentriLock, LLC, Cincinnati, OH (US)

(21) Appl. No.: 14/860,840

(22) Filed: Sep. 22, 2015

Related U.S. Patent Documents

Reissue of:
(64) Patent No.: 8,593,252
Issued: Nov. 26, 2013
Appl. No.: 12/883,628
Filed: Sep. 16, 2010

(51) Int. Cl.
*B60R 25/00* (2013.01)
*G07C 9/00* (2006.01)

(52) U.S. Cl.
CPC ..... *G07C 9/00896* (2013.01)

(58) Field of Classification Search
CPC .. G05B 1/00; G07C 9/00896; G07C 9/00571; G07C 2009/00793
USPC ..... 340/5.1, 5.61, 5.73, 12.5, 426.15, 572.3; 235/382, 462.46, 472.01
See application file for complete search history.

(56) References Cited

U.S. PATENT DOCUMENTS 4,808,993 A 2/1989 Clark
4,916,443 A 4/1990 Barrett et al.
5,377,906 A 1/1995 Mason
5,397,884 A 3/1995 Saliga
5,654,696 A 8/1997 Barrett et al.
5,705,991 A * 1/1998 Kniffin et al. ..... 340/5.28
6,072,402 A 6/2000 Kniffin et al.
6,195,712 B1 2/2001 Pawlowski
6,472,973 B1 10/2002 Harold et al.
(Continued)

FOREIGN PATENT DOCUMENTS

EP 1 410 346 B1 9/2006
GB 2 364 413 B 11/2004

OTHER PUBLICATIONS

International Search Report, PCT/US2008/006718, 10 pages (Aug. 8, 2008).

(Continued)

*Primary Examiner* — Linh M Nguyen
(74) *Attorney, Agent, or Firm* — Frederick H. Gribbell

(57) ABSTRACT

An electronic lock box system includes a wireless portable transponder that communicates with an electronic lock box using a low power radio link. The portable transponder includes: a wide area network radio to communicate to a central clearinghouse computer, a motion sensor to activate its wide area network radio, and a connector to communicate with a secure memory device. The electronic lock box sends a hail message that is intercepted by the portable transponder; the hail message includes identification information. The portable transponder responds with a message that includes a time sensitive encryption key; the lock box authenticates this response message using its own time sensitive encryption key. If the messages are authenticated, the lock box sends an access event record to the portable transponder, and this access event record is stored in the secure memory device. If a wide area network is available, the portable transponder sends the access event record to the central clearinghouse computer.

38 Claims, 8 Drawing Sheets

(56) References Cited

U.S. PATENT DOCUMENTS

| | | | | |
|---|---|---|---|---|
| 6,624,742 | B1 * | 9/2003 | Romano et al. | 340/5.73 |
| 6,678,612 | B1 * | 1/2004 | Khawam | 701/32.4 |
| 6,882,268 | B2 * | 4/2005 | Roz | G07C 9/00309 340/5.61 |
| 6,989,732 | B2 | 1/2006 | Fisher | |
| 7,009,489 | B2 | 3/2006 | Fisher | |
| 7,086,258 | B2 | 8/2006 | Fisher et al. | |
| 7,115,872 | B2 | 10/2006 | Bordynuik | |
| 7,177,819 | B2 * | 2/2007 | Muncaster et al. | 705/313 |
| 7,193,503 | B2 | 3/2007 | Fisher | |
| 2003/0179075 | A1 | 9/2003 | Greenman | |
| 2004/0252017 | A1 | 12/2004 | Holding et al. | |
| 2005/0264400 | A1 | 12/2005 | Fisher | |
| 2006/0106628 | A1 | 5/2006 | Faherty | |
| 2008/0246587 | A1 | 10/2008 | Fisher | |
| 2009/0030718 | A1 | 1/2009 | Bengson | |
| 2009/0153291 | A1 | 6/2009 | Larson et al. | |

OTHER PUBLICATIONS

International Search Report, PCT/US2011/051449, 20 pages (Mar. 12, 2012).
International Search Report, PCT/GB01/02908, 4 pages (Jul. 19, 2002).
Preliminary Examination Report, PCT/GB01/02908, 6 pages (Oct. 18, 2002).

* cited by examiner

ELECTRONIC LOCK BOX PROXIMITY ACCESS CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The technology disclosed herein relates generally to electronic lock box systems and is particularly directed to a system of the type that includes a portable transponder that communicates with an electronic lock box using a low power radio link. Embodiments are specifically disclosed as a portable transponder that includes both a low power radio to communicate to the lock box and a wide area network radio to communicate to a central clearinghouse computer; a portable transponder that includes a motion sensor to activate its wide area network radio; and a portable transponder that includes a smart card connector to communicate with a secure memory device. A further embodiment is disclosed that includes a portable transponder that communicates to an electronic lock box using a low power radio, and communicates to a central clearinghouse computer using a wide area network radio, and also provides a secondary computer to receive messages from the clearinghouse computer over the wide area network.

Embodiments are also disclosed as a system having an electronic lock box that sends a hail message using a low power radio that is intercepted by a wireless portable transponder, in which the hail message includes identification information corresponding to the lock box and a user identifier; the portable transponder responds with an encrypted message that includes a time sensitive encryption key; the lock box then authenticates this response message using its own time sensitive encryption key. If the messages are authenticated, the lock box sends an access event record to the portable transponder using the low power radio, and this access event record is stored in a secure memory device of the portable transponder. If a wide area network is available, the portable transponder sends the access event record to the central clearinghouse computer using the wide area network radio.

Another embodiment is disclosed as an electronic lock box system that tracks the visitation time of a property being accessed. Once the secure compartment of the lock box has been opened, the lock box begins to periodically transmit a PROMPT message, and if a portable transponder is in range (both using low power radios), an acknowledgement ("ACK") message is returned to the lock box. This periodic set of messages continues until the two devices are out of range to properly receive the other's message, and the duration time of this access event is tracked by storing information in memory regarding these periodic transmissions and receptions.

STATEMENT REGARDING FEDERALLY SPONSORED RESEARCH OR DEVELOPMENT

None.

BACKGROUND

Previous electronic lockbox systems that have had a portable electronic key to wirelessly communicate with the system lockboxes have required a constant battery drain at the lockbox itself, due to the requirement that the lockbox always be "listening" for a radio or light beam message that might be received at any time from the electronic key. Such lockbox systems accordingly tend to have a limited battery lifetime, and as such, the replacement of the lockbox batteries becomes a significant expense and a "nuisance" to the user, who must swap out the battery, or send the lockbox back to a dealer so that the dealer can swap out the battery. The more often a battery must be replaced, the more "down time" the user will experience per lockbox, and thus the greater the number of lockboxes that are needed by a user to maintain a specific number of operable lockboxes in the field.

In addition, previous electronic keys that have included a capability to wirelessly communicate directly with the system's central clearinghouse computer also tend to have a significant battery drain, especially those electronic keys that use cellular telephone systems as the communications link between the central computer and the electronic key. Although the batteries in the electronic keys might (typically) be rechargeable, it still can be an inconvenience for the user to have the key's battery go dead in the field, just when a lockbox is to be opened at a property site. Unless the user carries a spare (charged) battery, the user would not be able to use the electronic key to open the lockbox, thereby spoiling the showing of that property. In the conventional electronic lockbox systems, there is no backup plan to obtain access to the lockbox's secure compartment if the electronic key becomes inoperable.

SUMMARY

Accordingly, it is an advantage to provide an electronic lock box system that includes a wireless portable transponder, in which an electronic lock box to be accessed sends a hail message by a low power radio, and the portable transponder that is within range of the radio message will receive the hail message, and will respond with an encrypted message back to the lock box; the lock box hail message includes encrypted data that identifies the lock box and the user's identification number.

It is another advantage to provide an electronic lock box system in which a portable transponder responds to a hail message from an electronic lock box, in which the response includes a time sensitive encryption key.

It is yet another advantage to provide an electronic lock box system in which the electronic lock box receives a message from a portable transponder and authenticates the received message using the lock box's own time sensitive encryption key.

It is still another advantage to provide an electronic lock box system in which, after an authorized access has occurred, the electronic lock box sends an access event record to a portable transponder using a low power radio, and the portable transponder stores that access event record in a secure memory device.

It is a further advantage to provide an electronic lock box system in which a portable transponder which has received an access event record from an electronic lock box will now check for the availability for a wide area network, and if it is available, the portable transponder sends a message to a central clearinghouse computer in real time; and if the WAN is not available, the portable transponder queues the access event record in its memory for later transmission to a central clearinghouse computer.

It is yet a further advantage to provide an electronic lock box system that includes a portable transponder with a motion sensor that is used to activate the wide area network radio of the portable transponder, when needed.

It is still a further advantage to provide an electronic lock box system that includes a portable transponder, and after the transponder has been activated by a motion sensor, the transponder determines whether or not it needs to send a message to a central clearinghouse computer.

It is another advantage to provide an electronic lock box system in which a central clearinghouse computer receives data from a portable transponder, including an access event record after one of the system lock boxes has been accessed by an authorized user, and then the central clearinghouse computer initiates a real time data push to send important information to the user of the portable transponder, either directly to the transponder, or to a secondary device, or perhaps to an e-mail server.

It is yet another advantage to provide an electronic lock box system in which, during an authorized access event, the electronic lock box periodically sends timed interrogation prompt messages that are acknowledged by a portable transponder that is within communication range and, so long as the two devices continue to exchange data on a periodic basis (using their low power radios), the event timing continues to advance; once the communication loop ceases, typically due to the portable transponder moving out of communication range of the lock box, then both the lock box and the portable transponder will record in their respective memories the duration of the event.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a method for operating an electronic lock box system is provided, in which the method comprises the following steps: (a) providing an electronic lock box having a first processing circuit, a first memory circuit, a first short range wireless communications device, a secure compartment having a movable opening element that is under the control of the first processing circuit, and a first data input device: (i) periodically inspecting the first data input device to determine if it has been activated, and if so, determining a first input data value that is entered thereon by a user; (ii) retrieving data stored in the first memory circuit, including a unique lockbox identifier value; (iii) constructing a hail message from the unique lockbox identifier value and from the first input data value, and transmitting the hail message using the first short range wireless communications device; and (b) providing a portable transponder having a second processing circuit, a second memory circuit, and a second short range wireless communications device: (i) retrieving data stored in the second memory circuit, including a user identifier data value; and (ii) determining if the second short range wireless communications device has received the hail message from the electronic lock box; and if so, based upon the user identifier data value, determining if the hail message contains information corresponding to the identity of the user.

In accordance with another aspect, a method for operating an electronic lock box system is provided, in which the method comprises the following steps: (a) providing a central computer that includes a first processing circuit, a first memory circuit, a system database, and a first wireless data link; and (b) providing a portable transponder having a second processing circuit, a second memory circuit, a motion sensor, and a wide area network wireless communications device that acts as a second wireless data link; (i) maintaining the wide area network wireless communications device in a low power state during inactive periods when a user is not handling the portable transponder; (ii) activating the wide area network wireless communications device if the motion sensor provides an input state indicating that the portable transponder is being handled by the user; and (iii) determining if the portable transponder has a need to communicate with the central computer, and if so, transmitting identification data to the central computer using the wide area network wireless communications device.

In accordance with yet another aspect, a method for operating an electronic lock box system is provided, in which the method comprises the following steps: (a) providing an electronic lock box having a first communications circuit; (b) providing a first portable computer having a second communications circuit for communicating with the electronic lock box, and having a third communications circuit for communicating with a wide area network; (c) providing a second portable computer having a fourth communications circuit; (d) providing a central computer having a fifth communications circuit and a network server; (e) sending to the first portable computer, using the first communications circuit and the second communications circuit, access event data from the electronic lock box, in response to an access attempt of the electronic lock box by a user; (f) sending to the central computer, using the third communications circuit and the fifth communications circuit, the access event data from the first portable computer; (g) sending to the central computer, using the third communications circuit and the fifth communications circuit, identifying information pertaining to the lockbox and identifying information pertaining to the user; (h) creating an information data set at the central computer, in response to receiving the identifying information pertaining to the lockbox and identifying information pertaining to the user; and (i) sending to the second portable computer, using the fifth communications circuit and the fourth communications circuit, the information data set.

In accordance with still another aspect, an electronic lock box system is provided, which comprises: (a) an electronic lock box having a first processing circuit, a first memory circuit, a first short range wireless communications device, a secure compartment having a movable opening element that is under the control of the first processing circuit, and a first data input device, wherein the electronic lock box generally maintains the first short range wireless communications device in a sleep mode until becoming activated by user manipulation of the first data input device, and once activated, the first short range wireless communications device transmits a hail message; and (b) a portable transponder having a second processing circuit, a second memory circuit, a second short range wireless communications device, a second data input device for use by the user, and a motion sensor, wherein the portable transponder generally maintains the second short range wireless communications device in a sleep mode until becoming activated by the motion sensor undergoing a change in state indicating that the portable transponder is being handled by the user, and once activated, the second short range wireless communications device receives the hail message and acts upon it.

In accordance with a further aspect, an electronic lock box system is provided, which comprises: (a) a first electronic lock box having a first processing circuit, a first memory circuit, a first short range wireless communications device, and a secure compartment having a movable opening element that is under the control of the first processing circuit, wherein once the first electronic lock box becomes activated, the first short range wireless communications device transmits a first hail message; and (b) a portable transponder having a second processing circuit, a second memory circuit, and a second short range wireless communications device, wherein once the second short range wireless communications device receives the first hail message, the portable transponder sends a response message to authenticate itself to the first electronic lock box; (c) after the first electronic lock box receives the response message, and verifies that it is authentic, the first short range wireless communications device begins to periodically transmit a PROMPT message at predetermined intervals; (d) if the portable transponder is within range, the second short range wireless communications device transmits an ACK message each time the portable transponder receives the periodic PROMPT message; (e) thereafter, the portable transponder, under control of the second processing circuit, waits for N seconds, and if no further periodic PROMPT message is received during the N seconds waiting interval, then the second processing circuit determines that a "missing PROMPT" status is in effect; and (f) the first electronic lock box, under control of the first processing circuit, waits for M seconds, and if no ACK message is received during the M seconds waiting interval, then the first processing circuit determines that a "missing ACK" status is in effect.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
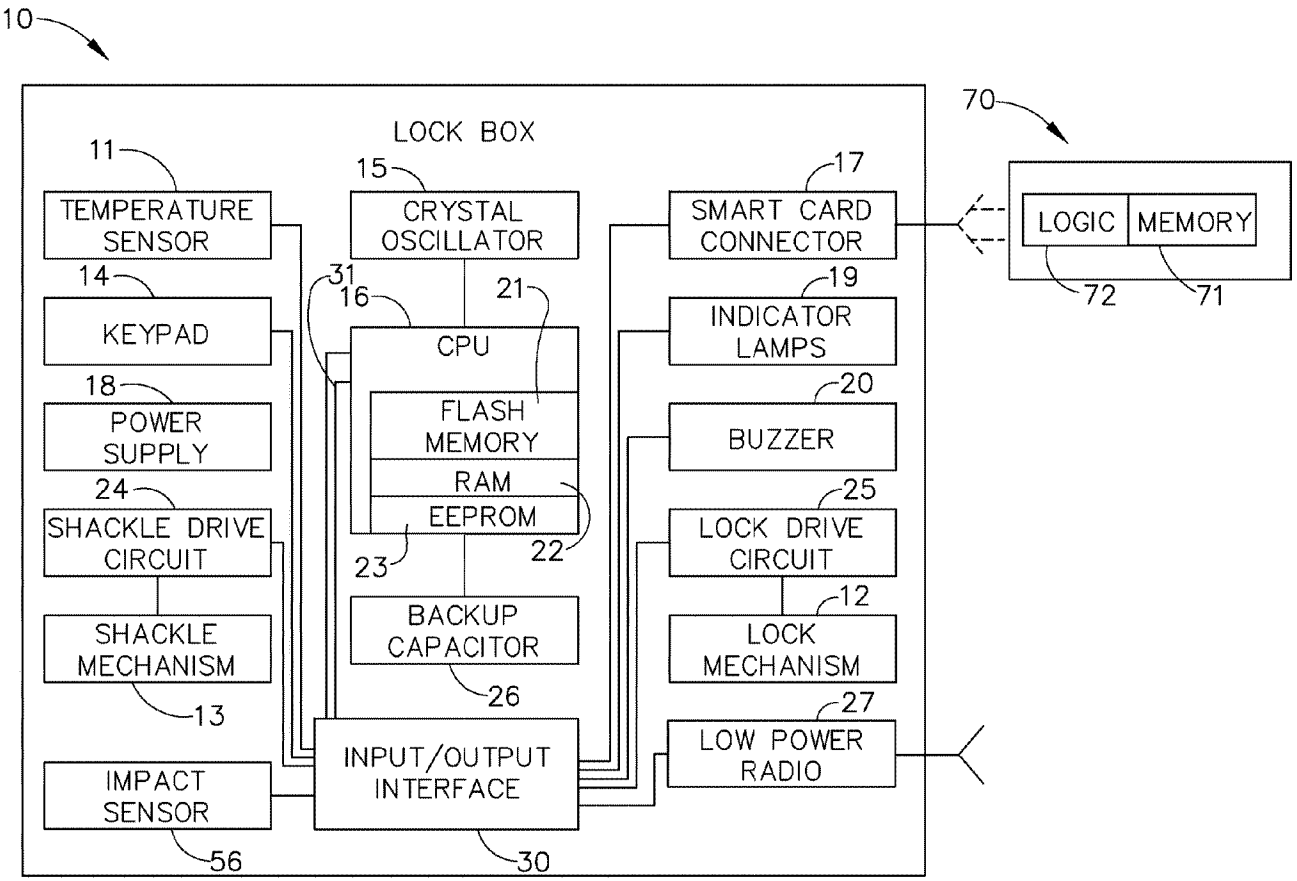
FIG. 1 is a schematic block diagram of the electrical components of an electronic lock box, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments disclosed herein include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to the drawings, FIG. 1 illustrates an exemplary embodiment of an electronic lock box generally designated by the reference numeral 10, which is suitable for use with the technology disclosed herein. Lock box 10 has an outer housing, which includes a keypad 14 (see FIG. 2), and the housing includes a movable key compartment door 32 (see FIG. 2). The upper housing of lock box 10 includes two receptacles (not shown) that receive a shackle 40 (see FIG. 2). The shackle 40 has an upper portion 46 and two shackle extensions (not visible in FIG. 2) that fit through the receptacles. It should be noted that the keypad 14 may also be referred to as a "data input device," in which a human user may press one or more of the keys to enter data, such as numeric information.

The electronic circuitry of electronic lock box 10 is illustrated in block diagram form in FIG. 1. In this illustrated embodiment, electronic lock box 10 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip), a shackle drive circuit 24, a shackle release mechanism 13, a key compartment mechanism drive circuit 25, a key compartment lock/release mechanism 12, and a membrane style keypad 14 for user data entry. An impact sensor 56 can also be included in electronic lock box 10, to detect abnormal mechanical forces that might be applied to the device.

An input/output (I/O) interface circuit 30 is included to provide signal conditioning as needed between the CPU 16 and other components that typically use voltage and/or current levels that are not typically able to hook up directly to a processing device, such as sensors and output device driver circuits. Each appropriate I/O signal is directed through a separate channel of the I/O interface circuit 30, unless perhaps more than one signal of a particular voltage and current rating can be multiplexed, in which case a multiplexer circuit can be included in the I/O interface circuit 30. The data signals between I/O circuit 30 and the CPU 16 run through a low voltage signal bus 31.

A data interface in the form of a low power radio 27 is included in this embodiment so that the CPU 16 is able to communicate with other external devices, such as a separate portable transponder 100 (see FIG. 2) that uses a compatible wireless data link. The portable transponder 100 also includes a low power radio 127, which communicates with radio 27 using a protocol that could be proprietary, if desired. However, the radios 27 and 127 could use any number of various communications protocols, such as BluetTooth, although the data structure in the messages between radios 27 and 127 certainly could be encrypted, or otherwise formatted in a proprietary manner. Radios 27 and 127 further could comprise other types of wireless communications devices that may not operate on a strictly radio principle, including types of wireless communications devices that have not been invented as of yet. In this description, such wireless communications devices will typically be referred to as "radios;" however, in this patent document they may also be referred to as a "short range wireless communications device," or a "low power wireless communications device."

Microprocessor 16 controls the operation of the electronic lock box 10 according to programmed instructions (electronic lock box control software) stored in a memory device, such as in FLASH memory 21. RAM memory 22 is typically used to store various data elements such as counters, software variables and other informational data. EEPROM memory 23 is typically used to store more permanent electronic lock box data such as serial number, configuration information, and other important data. It will be understood that many different types of microprocessors or microcontrollers could be used in the electronic lock box system 10, and that many different types of memory devices could be used to store data in both volatile and non-volatile form, without departing from the principles disclosed herein. In one mode of an exemplary embodiment, the electronic lock box CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lock box. Capacitor 26 is used to provide temporary memory retention power during replacement of battery 18. It will be understood that an alternative electrical power supply could be used if desired, such as a solar panel with the memory backup capacitor.

As noted above, electronic lock box 10 includes a shackle 40 that is typically used to attach the box 10 to a door handle or other fixed object. Electronic lock box 10 also includes a key compartment which typically holds a dwelling key (not shown), and which can be accessed via the key access door 32 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 40 and key compartment 32 can be constructed of many different types of mechanical or electromechanical devices without departing from the principles disclosed herein.

The crystal oscillator 15 provides a steady or near-constant frequency (e.g., at 32.768 kHz) clock signal to CPU 16's asynchronous timer logic circuit. The ISO-7816 smart card connector 17 connects to electrical contacts on a "smart card" 70 to allow the exchange of data between the electronic lock box's CPU 26 and memory devices 71 in the smart card 70 (discussed below in greater detail). The smart card 70 itself typically will include some control logic circuits 72, to prevent "easy" or unauthorized access to the memory elements 71 on-board the card 70.

It should be noted that an electronic key (such as that described above) could be used as a type of secure memory device for the element at reference numeral 70, rather that a classic "smart card." Such an electronic key would also contain memory elements 71, and perhaps would contain some control logic circuits 72, although the control logic circuits might be optional, depending on the type of electronic key device that is used. With regard to FIG. 1, if an electronic key is used, it could be interfaced to the CPU circuit 16 of the electronic lock box 10 is many different ways, including via an electrical circuit that makes contact between the lock box 10 and the electronic key 70 (similar to that depicted on FIG. 1), or perhaps via an electromagnetic signal such as a short range radio wave, or an optical signal. As used herein, the term "electronic key" can have a meaning to include a relatively simple device, such as a secure memory card (or a "smart card"), and it can have a meaning to include a sophisticated device, such as a laptop computer that has a wireless communications circuit to send and receive messages from other devices, including an electronic lock box and/or a central clearinghouse computer. A "typical" electronic key will generally be a more sophisticated device.

In one embodiment, the digital temperature sensor 11 is read at regular intervals by the electronic lock box CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lock box operating environment temperature. As noted above, a single chip can be used to replace the combination of crystal oscillator 15 and temperature sensor 11, such as a part number DS32 KHZ manufactured by Dallas Semiconductor.

The LED indicator lamps 19 and piezo buzzer 20 are included to provide both an audible and a visual feedback of operational status of the electronic lock box 10. Their specific uses are described in detail in other patent documents by the same inventor, as noted below.

The impact sensor 56 can be used to notify an external device, in case of an attempted removal or other type of damage being done to the lock box 10, including intentional damage. Such an external device could comprise a "base station" as described in detail in other patent documents by the same inventor, or it could comprise the portable transponder 100 that is described herein.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 2:
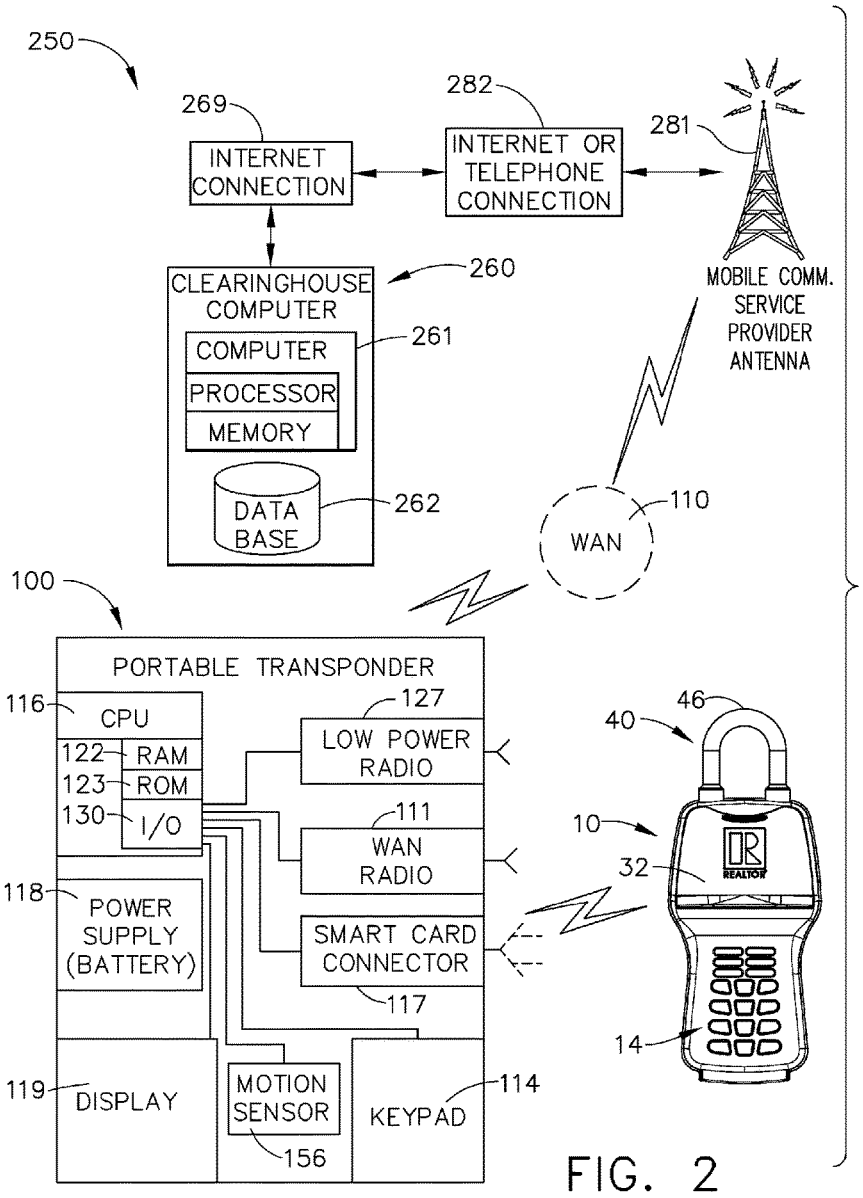
FIG. 2 is a diagrammatic view of the major components of a first embodiment of an electronic lock box security system, including a central computer station, a wireless portable transponder device, and a portable electronic lock box apparatus such as that depicted in FIG. 1.

Referring now to FIG. 2, a first embodiment electronic lock box system, generally designated by the reference numeral 250, is depicted. The system 250 includes one or more electronic lock boxes 10, perhaps one or more secure memory cards (not shown on FIG. 2), portable transponder devices 100, a central clearinghouse computer system 260 (also sometimes referred to herein as a "CCC"), and a wireless data communications system, represented by Internet® connections 269 and 282, and a mobile phone provider 281. The central clearinghouse computer 260 typically will include a database 262 which contains a repository of electronic lock box identification and attribute information, and also contains a repository of information about real estate agents. A computer 261 controls the database 262, and includes a processing circuit and a memory circuit (in addition to any bulk memory storage devices that contain the database 262).

Referring now to FIG. 2, an electronic lock box system of a first embodiment is depicted in a diagrammatic view. An electronic lock box 10 is depicted in the lower-right corner of FIG. 2, and is shown communicating to a portable transponder 100. As discussed above, portable transponder 100 includes a low power radio 127 that can communicate data to and from the low power radio 27 of the electronic lock box 10. Some of the other components of the portable transponder 100 are depicted on FIG. 2.

In this embodiment, portable transponder 100 includes a microprocessor (CPU) 116, random access memory (RAM) 122, read only memory (ROM) 123, and an input/output interface circuit 130. There are several devices that are in communication with the input/output (I/O) circuit 130, as discussed immediately below.

The low power radio 127 communicates data to and from the CPU 116, via the I/O circuit 130. A wide area network (WAN) radio 111 is provided, and it also communicates data to and from the CPU 116, via the I/O interface circuit 130. Portable transponder 100 also includes a smart card connector 117, which is essentially identical to the smart card connector 17 that is provided on the electronic lock box 10. Portable transponder 100 also includes a display 119, a keypad 114, a power supply 118 (typically a battery), and a motion sensor 156. The motion sensor 156 provides additional capability for the portable transponder 100, as discussed in greater detail below.

Because of its wide area network radio 111, portable transponder 100 is able to communicate to the clearinghouse computer 260 over a wide area network (WAN), which is generally designated by the reference numeral 110. Assuming that the mobile communications service provider 281 is a cellular telephone system, the portable transponder 100 will have the capability of essentially immediate communications with the clearinghouse computer 260 from many, many locations, including most locations where an electronic lock box 10 has been situated. On the other hand, if a particular electronic lock box 10 is located in a very remote area, where there is no cellular telephone connection coverage, then the wide area network 110 therefore would not reach that location, and the portable transponder 100 would not be in immediate communication with the clearinghouse computer 260. This situation will be discussed below in greater detail.

The wide area network radio 111 further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications device," or as a "medium range wireless communications device."

In a preferred mode of the first embodiment depicted on FIG. 2, the portable transponder 100 includes a connector 117 that is capable of accepting a secure memory card (such as a "smart card"), so that a user who typically connects his or her secure memory card directly to an electronic lock box 10 will also be able to connect the same secure memory card to the portable transponder 100, and have much the same results. This will be described in greater detail below. Note that the smart card connector can also be referred to as a "data interface" that communicates with a "secure memory device"—a "smart card" is an example of a secure memory device.

The first radio circuit of the portable transponder is the low power radio 127 to such as Atmel's AT86RF23x series that uses a low power radio frequency signal. The portable transponder also includes a second radio circuit which is capable of longer range communications for wide area network connectivity, such as Wavecom's WISMO22x series.

In a preferred embodiment, the CPU 116 will comprise a low power microcontroller, and a relatively low power visual display 119 will be provided to allow indication of operating status. The motion sensor 156 is to be included as an internal motion sensor that is coupled to the microcontroller (CPU 116). Its capability and use is described below.

The low power communications circuit in the lock box (e.g. low power radio 27) provides sufficient range to enable proximal communications with a portable transponder 100 that is carried by the lock box system user. The built in wide area communication radio of the transponder (e.g., WAN radio 111), such as radios used by a cellular carrier, enables a host of other system features. One desirable feature of this arrangement is for individuals who access an electronic lock box to be unencumbered with other devices. For example, real estate agents often have their hands full when approaching a lock box, and such an agent that is equipped with a portable transponder 100 can enter a personal identification code on the keypad 114 of the portable transponder 100. It should be noted that the keypad 114 may also be referred to as a "data input device," in which a user (e.g., "agent") may press one or more of the keys to enter data, such as numeric information.

Such an agent could initially use the portable transponder and its keypad while remaining in a vehicle, for example, and inserting their secure memory card into the connector 117 of the portable transponder 100. In this mode, the agent can prepare his or her portable transponder to be ready to communicate his or her personal identification code from the transponder 100 to the lock box 10 over the low power radio link (between radios 127 and 27), and the electronic lock box will interpret that radio signal to allow access to the key compartment door 32. In this manner, the lock box radio system retrieves data from the portable transponder 100 to facilitate access to the dwelling key that is contained within the secure compartment of the electronic lock box 10.

In another operating mode, a secure memory card that is connected to smart card connector 117 of the portable transponder 100 can have data read from the memory elements of the secure memory card 70 that is connected to the portable transponder 100, and have that data sent to the electronic lock box over the low power radio link, thereby having the secure memory card's data "read" by the electronic lock box CPU 16. Furthermore, if it to is desirable to write data onto the memory elements 71 of a secure memory card 70, that function can occur while the secure memory card is connected to the smart card connector 117 of the portable transponder 100, by having the low power radio 27 of the electronic lock box 10 transfer data to the portable transponder 100, and the CPU 116 can then write data onto the secure memory card, via the smart card connector 117. This could be accomplished to write the same types of data that would otherwise be written directly by the lock box 10 to the secure memory card 70 as it is connected into the smart card connector 17 of the lock box itself.

The use of secure memory cards offer many advantages with the electronic lock box system for access to the lock box, which is well documented in previous patents and patent applications filed by the same inventor of this patent document. To further enhance security, the lock box can use data that the portable transponder 100 has retrieved over its wide area radio system (i.e., the WAN 110), such as the current (real time) decryption key for use with the secure memory card. If the portable transponder loses contact with the central clearinghouse computer system 260, or if the secure memory card is either lost or stolen, the decryption key update credentials of the portable transponder can be revoked at the central clearinghouse computer, thereby disabling further access to lock boxes by that secure memory card.

Figure 3:
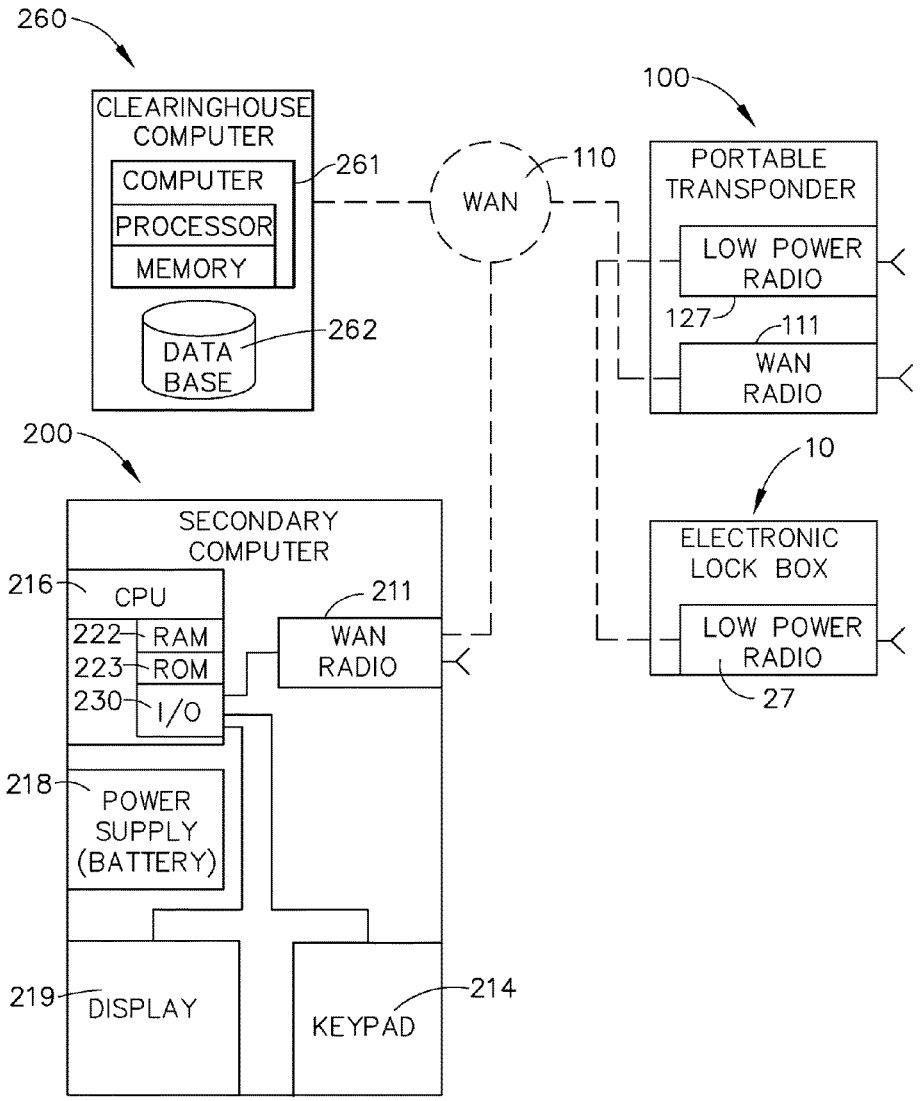
FIG. 3 is a diagrammatic view of the major components of a second embodiment of an electronic lock box security system, including a central computer station, a wireless portable transponder device, a wireless portable secondary computer, and a portable electronic lock box apparatus such as that depicted in FIG. 1.

FIG. 3 illustrates a second embodiment of an electronic lock box system that includes the central clearinghouse computer 260, one or more portable transponders 100, and one or more electronic lock boxes 10. The system of FIG. 3 also includes a wide area network 110 that could use a standard cellular telephone service, if desired.

The clearinghouse computer 260 includes a computer 261 with a processor and memory, and also includes a database 262 to hold access event data as well as a myriad of other types of information used by the electronic lock box system. The portable transponder 100 again includes a low power radio 127 and a wide area network radio 111. The electronic lock box 10 again includes a low power radio 27, which communicates with the transponder's low power radio 127.

The second embodiment system of FIG. 3 includes an additional component, which is listed thereon as "secondary computer" 200. Secondary computer 200 includes a microprocessor (CPU) 216, and this computer (or processing circuit) also is coupled to random access memory 222, read only memory 223, and an input/output interface circuit 230. The secondary computer 200 also includes a display 219, a keypad 214, a power supply 218 (typically a battery), and a wide area network (WAN) radio 211. The WAN radio 211 can also be placed in communication with the wide area network 110, and therefore, can communicate with the clearinghouse computer 216 or the portable transponder 100 as desired.

As described above, the secondary computer 200 could be constructed as a standard commercial device, such as a wireless laptop computer, or an Internet-compatible cellular telephone (or "smart phone"), for example. The uses of the secondary computer 200 will be described below.

The configurations of the electronic lock box systems depicted in FIGS. 2 and 3 offer new modes of operation and capabilities that were not previously available. Using the first embodiment system of FIG. 2, an access request routine is described in a flow chart depicted on FIG. 4. The routine begins at a step 300, and at a step 302 the user enters his or her personal identification number on the keypad 14 of an electronic lock box 10. At the completion of this sequence, the electronic lock box transmits a hail message to any portable transponders 100 that are in the area, at a step 304. This hail message comprises an encrypted data block that identifies the specific electronic lock box and also the PIN of this user (which was just entered on the lock box keypad). Compatible portable transponders that are in the vicinity and receive this hail request will retrieve the data that is present on the secure memory card that is plugged into their smart card connector 117 to compare the encrypted PIN data transmitted in the hail message with the data that has been stored on the secure memory card (in the smart card connector 117). This occurs on the flow chart of FIG. 4 at a decision step 310, where it is determined whether a portable transponder has received the hail. If not, then the logic flow is directed back to the beginning step 300 of this routine.

If the answer is YES at step 310, then a decision step 312 determines whether the portable transponder's stored data matches the encrypted data. If not, then the logic flow is directed back to the beginning step 300. Otherwise, the logic flow is directed a step 314.

Due to the number of combinations of PIN codes and the distributive nature of the electronic lock boxes in a typical system, the probability of matching more than one portable transponder is extremely remote. The particular user's portable transponder 100 which contains the secure memory card with a matching PIN code will acknowledge the lock box hail request by transmitting back to the lock box 10 a unique identifier, which occurs at a step 314.

A decision step 320 now determines whether or not the lock box 10 has received the transponder's message. If the answer is NO, and this is determined by the portable transponder, then the transponder 100 will again try to send its unique identifier message to the lock box more than once. The number of such attempts is determined by a step 316, which causes the step 314 to occur multiple times. On the other hand, if the lock box 10 does receive the transponder message, then the logic flow will be directed to a step 322.

At step 322, the lock box 10 instructs the portable transponder 100 to retrieve data from memory. In this instance, the portable transponder is instructed to retrieve one or more data elements from the secure memory card 70 that is connected at the smart card connector 117. For enhanced security, data messages between the lock box 10 and the portable transponder 100 are encrypted with the most recent time-sensitive encryption key that has been received by the portable transponder over the wide area radio communications link (WAN network 110). This message sent by the portable transponder 100 occurs at a step 324 on the flow chart of FIG. 4. The electronic lock box 10 attempts to authenticate the transponder message, using the lock box's internally generated time sensitive encryption key, at a step 326.

A decision step 330 determines whether or not the authentication attempt by the lock box 10 accomplishes a match. If not, the logic flow is directed to a step 332 which determines that the portable transponder 100 needs an updated encryption key. In this situation, access is not granted at a step 334, and the logic flow is directed to the end of this routine at a step 344. In essence, access to the secure memory card data is not being granted due to a mismatch between the portable transponder's encryption key data and the encryption key data that is provided by the electronic lock box itself. This occurs because the portable transponder 100 has not retrieved the most recently updated decryption key from the central clearinghouse computer 260, and therefore, access to the lock box 10 must be denied.

On the other hand, if an authentication match occurs at decision step 330, then access is granted at a step 340. In this situation the portable transponder 100 will allow the electronic lock box 10 to use the low power communication link (between the low power radios 27 and 127) to communicate through the portable transponder to read and write data to and from the memory elements 71 of the secure memory card 70, at a step 342. This reading and writing data involving the secure memory card memory elements 71 will occur, just as if the secure memory card 70 was physically connected to the electronic lock box 10 using the lock box's on-board smart card connector 17. However, this now occurs using the portable transponder's smart card connector 117.

This new method for obtaining access to the lock box's secure compartment has occurred under a "hands free" situation, which provides maximum convenience for the user. The user can manipulate the keypad data entry and install his or her secure memory card on the portable transponder 100, while remaining in a vehicle, if desired. The user can then easily carry the transponder in a pocket or purse, while approaching the lock box 10. The user enters his or her PIN code on the keypad 14 of the electronic lock box and then can physically access the secure compartment to obtain the dwelling key for entry onto the premises. The lock box 10 will automatically send a hail message, and the portable transponder 100 will automatically answer that hail message, without the user further manipulating the portable transponder while at the lock box. This represents the "hands free" attribute of the access request routine of FIG. 4

After the lock box has written and read data to and from the memory connected to the portable transponder, the logic flow is directed to the end of the access request routine, at decision step 344.

Figure 5:
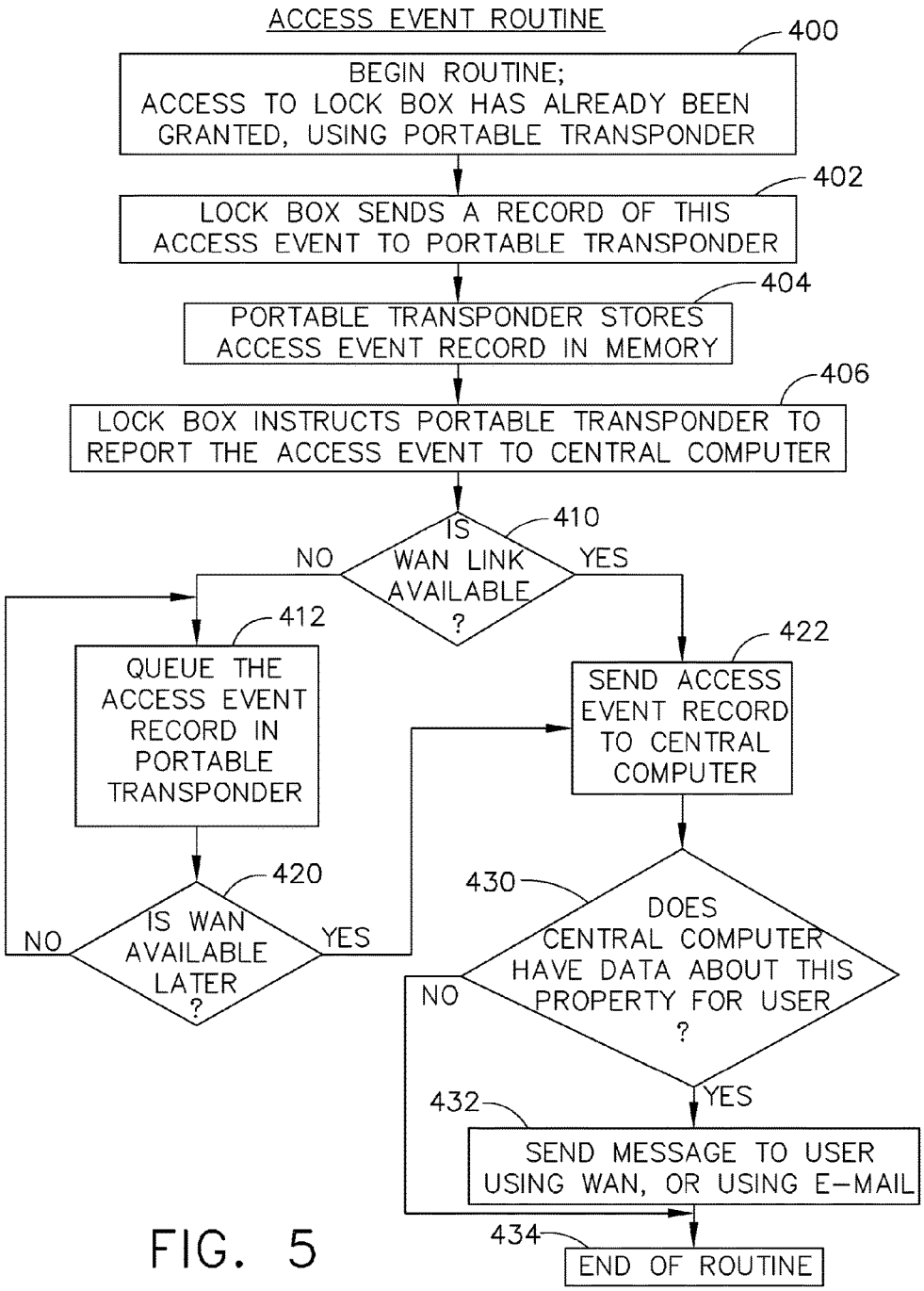
FIG. 5 is a flow chart of the steps performed by an access event routine, as used by the electronic lock box security system of FIG. 2 or FIG. 3.

Referring now to FIG. 5, a flow chart is provided for an access event routine which occurs during an access event by a user of one of the system electronic lock boxes. The routine begins at a step 400, in which access to the specific lock box has already been granted using a portable transponder 100. The particular electronic lock box 10 now sends a record of this access event to the portable transponder, using the low power radios 27 and 127 of the respective system components. The data record is to be stored on a secure memory card 70 that is attached to the portable transponder (at the smart card connector 117), and this occurs at a step 404 on FIG. 5. The particular lock box now instructs the portable transponder to report this access event to the central computer 260, at a step 406. This is to occur using the wide area network 110, in which the portable transponder sends the message using its WAN radio 111, which will eventually reach the clearinghouse computer 260.

Before the access event is actually received at the central clearinghouse computer 260, a decision step 410 first determines whether or not the WAN link is available. If not, then the logic flow is directed to a step 412 in which the access event record is queued in the portable transponder's memory. The WAN link could be unavailable due to low battery power, or perhaps the portable transponder is presently out of range of one of the cellular service areas, for example. Therefore, the access event data is queued for future transmission by the portable transponder 100.

Once the access event record has been queued in the portable transponder 100, a decision step 420 will be executed, in which the portable transponder will continue to determine whether or not the wide area network is available at a later time. If not, then the logic flow is directed back to step 412 where the access event record remains queued in the transponder's memory. When the WAN later does become available, then the logic flow is directed to a step 422.

If the WAN link was available at decision step 410, or later becomes available at decision step 420, then step 422 will send the access event record to the central computer 260 over the wide area network 110. The type of information that is sent to the central clearinghouse computer at step 422 includes the serial number of the lock box that has been accessed, the user identification number that has accessed that lock box, and a time and date stamp that indicates when the access event occurred.

Once this access event record is received at the central computer, a decision step 430 determines whether or not the central computer currently has data about this particular property for this specific user. If not, then the logic flow is directed to a step 434, which is the end of this access event routine. However, if the central computer does have data for this user and this specific property, then a step 432 sends a message from the central computer to the user, either using the wide area network, or perhaps using electronic mail.

The type of data that is sent to the user from the central clearinghouse computer at step 432 can include a text message about certain property information including the price of the property and various information regarding showing activity of that property. After this message has been sent to the user, the logic flow reaches the end of routine step 434.

The additional data that may be stored at the central computer and is the subject of steps 430 and 432 of FIG. 5 is an enhancement to the lock box system, in which the central clearinghouse computer 260 can "push" such data either to the portable transponder 100, or perhaps to a secondary wireless device such as a smart phone that is also carried by the user. This secondary wireless device is represented as the "secondary computer" 200 in FIG. 3. This enhanced data can contain pertinent information about the property, such as recent access activity or sales-related activity, relative frequency of access to the property, secondary alarm system codes that may be needed to enter the property, and other types of important data. The enhanced data is thereby delivered in near real-time over at least one of the various wireless communication links, just after the portable transponder has sent the access event record to the central clearinghouse computer at step 422 of the flow chart on FIG. 5.

To significantly extend battery life, a relatively sensitive motion sensor is used in the portable transponder to detect activity by its user. This is reference to the motion sensor 156 of the portable transponder 100. One suitable motion sensor is the SignalQuest model SQ-SEN-200. Typically the only time it is desirable to communicate over the wide area radio communication link is when the user is actively engaged in accessing one of the lock boxes in the system. To save power, the portable transponder's microcontroller (e.g., CPU 116) keeps the radios off until the motion is sensed. Most wide area communication radios draw substantial current to maintain connectivity with the wide area network, even when the device is essentially inactive with regard to supporting a desired communication functionality. In the portable transponder 100, the motion sensor 156 is used to wake the device to see if the portable transponder should enter a period of more active communication with the central clearinghouse computer 260.

Figure 6:
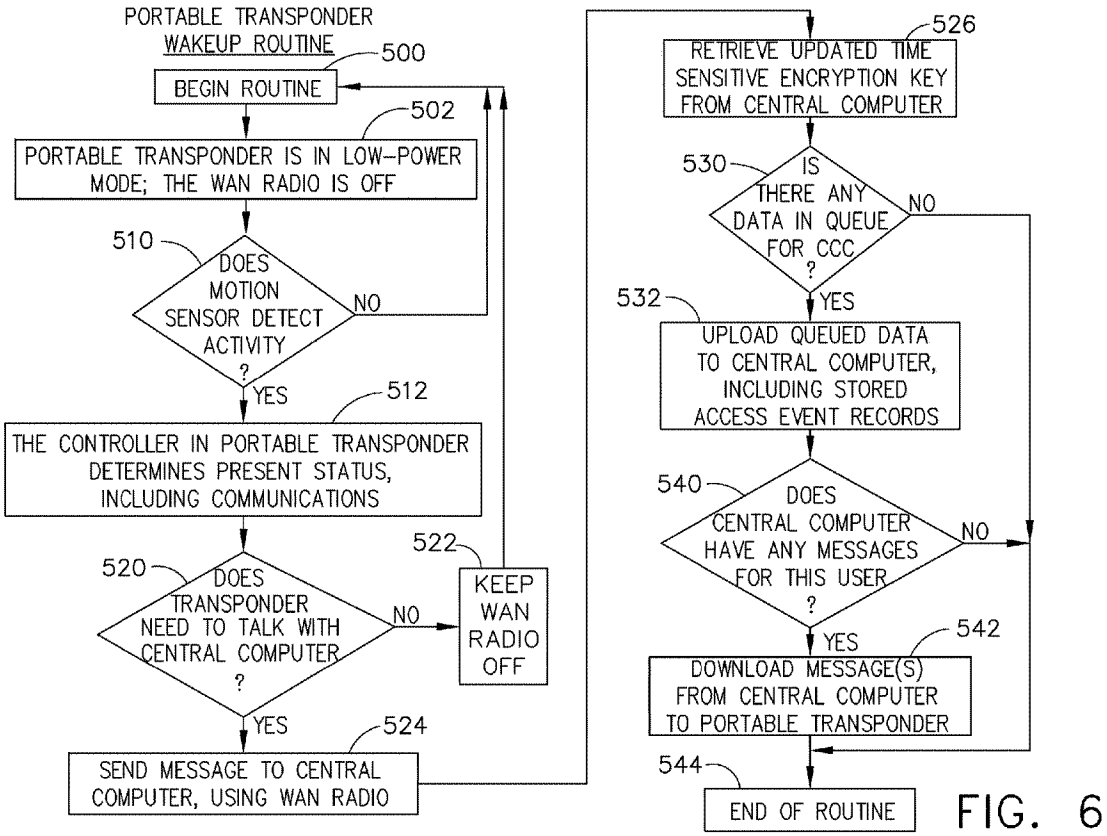
FIG. 6 is a flow chart of the steps performed by a portable transponder wakeup routine, as used by the electronic lock box security system of FIG. 2 or FIG. 3.

A portable transponder wakeup routine is provided as a flow chart on FIG. 6. The routine begins at a step 500, and a step 502 begins with the portable transponder in its low-power or "sleep" mode, with the wide area network radio off. During step 502, the microcontroller of the portable transponder is generally in its "sleep mode." In addition, the modem that communicates with the WAN radio also is in its "sleep mode." When active, the modem and WAN radio transmitter typically draw about one Ampere. So it can be seen that the sleep mode saves a great deal of power.

It should be noted that there could be more than one way of causing a "sleep mode" for the portable transponder's radio; for example, electrical power to the radio's to transmitter stage could be interrupted by a solid state switch or an electromechanical switch (or relay), or the electrical power to the entire radio could be interrupted, if desired. In addition, except for a low power timing circuit, it also is possible to place the entire electrical circuit of the portable transponder into a "sleep mode" if desired, and periodically wake the processing circuit for a very short time period to inspect its inputs and determine if it should then perform additional functions, or immediately go back into its sleep mode. The same is true for the electrical circuits of the electronic lock box 10—this methodology can save a major amount of battery power for these remotely-used portable devices.

A decision step 510 determines whether or not the motion sensor detects activity. If not, then the logic directed back to the Begin Routine step 500. In reality, nothing substantial has occurred because the microcontroller has kept the wide area network radio off and the motion sensor has not detected any activity to require a different status of the device.

If the motion sensor has detected activity at step 510, then a step 512 requires the controller in the portable transponder 100 to determine the present status, including its communication status. Upon "waking" in response to the motion induced by the user, a decision step 520 determines whether the transponder needs to talk with the central clearinghouse computer 260. If not, then a step 522 keeps the WAN radio off, and the logic flow is directed back to the beginning of the routine at step 500.

In decision step 520, some of the information that is inspected to make this determination is as follows: (a) determine the current epoch time (b) determine if an update is required for the secure memory card that is connected to the portable transponder at the smart card connector 117; (c) determine if any data needs to be sent to the central clearinghouse computer; and (d) if either part (b) or (c) is true, activate the modem and connect wirelessly to the central clearinghouse computer to send a message establishing contact with the central computer (at step 524).

On the other hand, if the transponder does have a need to communicate with the central computer, then a step 524 sends a message to the central computer, using the wide area network radio 111, in order to retrieve an updated time sensitive encryption key if the portable transponder is within communication range of the wide area network 110. A step 526 retrieves the updated time sensitive encryption key, which is in a message sent from the central computer 260 to the portable transponder 100 over the wide area network 110.

In addition to the above, if there is any pending data at the portable transponder 100 that should be exchanged with the central clearinghouse computer 260 because of previous lock box activity while the portable transponder was out of range of a receiver on the wide area network, that data can now be uploaded to the central clearinghouse computer. A decision step 530 determines whether or not there is any such data in the queue that should be delivered to the central clearinghouse computer. If there is no such data, then the logic flow is directed to a step 544, which is the end of the wakeup routine for the portable transponder. On the other hand, if there is data that has been queued for the clearinghouse computer, then a step 532 uploads the queued data to the central computer, including stored access event records.

A decision step 540 determines whether or not the central computer 260 has any messages for this particular user. If not, then the logic flow is directed to the end of routine, at step 544. If there are any messages for the user, then a step 542 will download such messages from the central computer to this portable transponder. After that has occurred, the end of the wakeup routine has been reached at step 544.

If desired, an additional switch could be added to the portable transponder 100 to activate the microcontroller. This could be a separate "wake-up" switch, which could be connected in parallel to the motion sensor 156. Furthermore, if the user presses any of the keys on the keypad 114, that could also be used as an indication to activate the CPU 116 of the portable transponder 100.

By using the motion sensor, additional power savings are enabled since this configuration avoids having the portable transponder continue to try and periodically connect to the wide area network 110, unless the portable transponder has been physically handled (or moved) by the user. One event that could be programmed into the CPU 116 to activate the WAN radio 111 could be if the user pressed any of the keys of the keypad 114. This could be an additional condition that could be used even if the motion sensor 156 had not detected a sufficient amount of motion to activate the WAN radio. It should be noted that the CPU 116 of the portable transponder 100 would need to be periodically activated and then quickly de-activated, so that the logical operations of the flow chart of FIG. 6 can be executed. For example, the CPU 116 could be activated once per second, just for a sufficient amount of time to see if any of its interrupt lines have been activated at that moment. If not, then the to CPU could be quickly de-activated, thereby saving battery power. This type of feature is already built into the electronic lock boxes sold by SentriLock LLC.

Another advantage of the lock box system of FIGS. 1, 2, and 3 is the flexibility of the removable secure memory card, also referred to herein as the "smart card." In the event that the portable transponder's battery 118 becomes depleted, the user can remove the secure memory card from the smart card connector 117 of the portable transponder 100, and then insert that same secure memory card into the smart card connector 17 of an electronic lock box 10. This allows a user to immediately gain access to the lock box, even if the user is many miles from his or her home location. And this access can occur without a lengthy round trip to replenish the battery of the portable transponder, in this "emergency" situation. Of course, the user would likely replenish the transponder's battery at the next opportunity.

Figure 7:
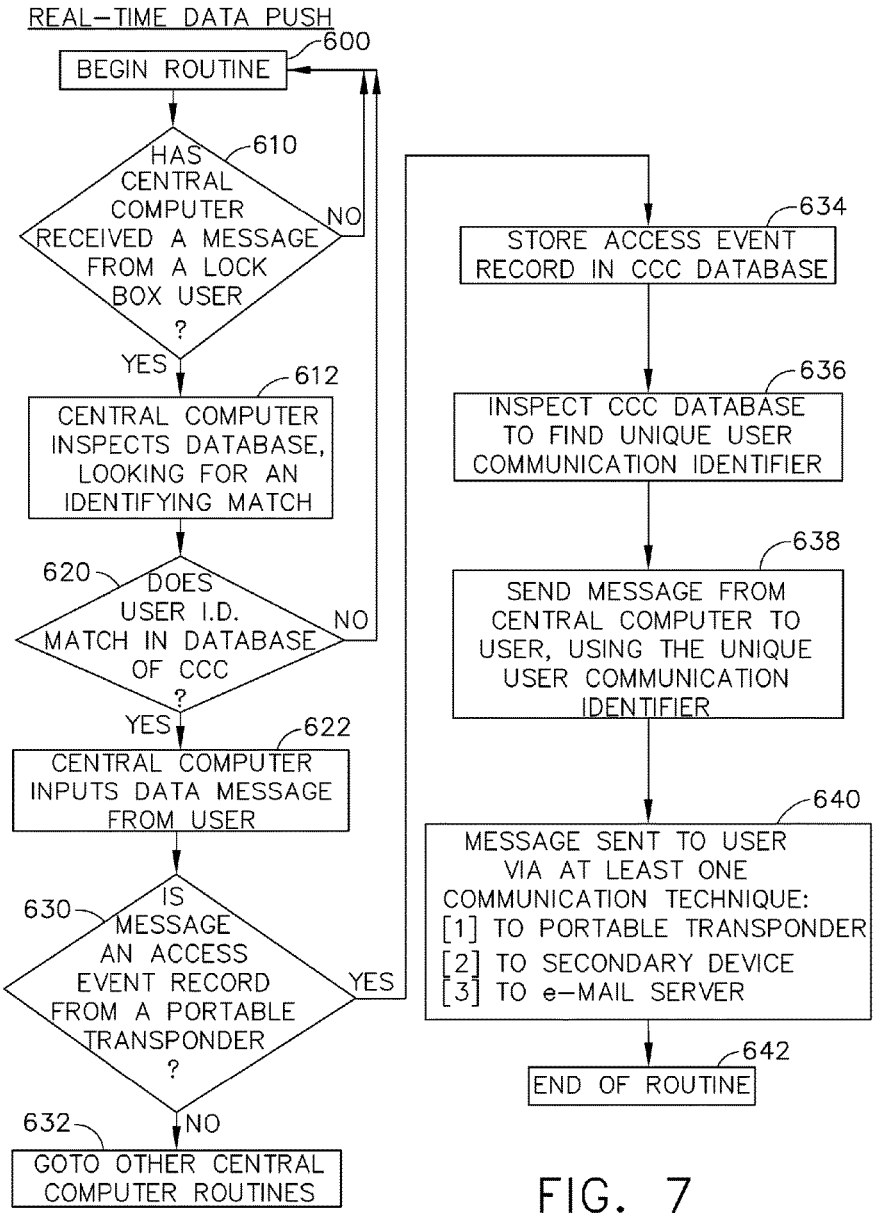
FIG. 7 is a flow chart of the steps performed by a real-time data push routine, to as used by the electronic lock box security system of FIG. 2 or FIG. 3.

Another feature of the electronic lock box system of FIGS. 1, 2, and 3 is the possibility for a user to receive near real-time information updates while the user is present at a lock box 10. This can be a desirable feature, and is possible when using a "real-time data push" routine that is depicted in the flow chart of FIG. 7. The routine begins at a step 600 and a decision step 610 determines if the central computer 260 has received a message from a lock box user. If not, then the logic is directed back to the beginning step 600. However, if the answer is YES then a step 612 causes the central computer to inspect its database 262, searching for an identifying match of the identity of the lock box user that it has just received a message from. This user identifier would be a type of "mobile terminal identifier" such as a cell phone number, a mobile IP (Internet Protocol) address, or some other type of unique identifier that has been stored in the database of the central clearinghouse computer. It would be preferred for the mobile terminal identifier to be a number or alphanumeric string that is automatically sent by the portable transponder, in which this string is parsed out from the other portions of the transmission that has been sent to the central clearinghouse computer 260 by the portable transponder 100.

A decision step 620 now determines if the user identifier matches the mobile terminal identifier that has been stored in the database of the clearinghouse computer. If not, then the logic flow is directed back to the beginning of the routine at step 600. If the answer is YES at step 620, then a step 622 causes the central computer 260 to input the data message that is being received from this user. A decision step 630 determines if the incoming message to the clearinghouse computer 260 is an access event record from a portable transponder 100. If the answer is YES, then the logic flow is directed to a step 634. If not, then the clearinghouse computer 260 goes on to execute other central computer routines at a step 632 on FIG. 7.

Step 634 stores the access event record in the central clearinghouse computer's database 262. After that has occurred, a step 636 has the central clearinghouse computer 260 inspect its database to find the unique user communication identifier; a step 638 will prepare a message from the central computer 260 to the user, using the user's communication identifier information. This data could consist of local alarm system codes, property information such as its current price, statistical analysis of property showing activity in the area, comparative information about a visited property with others that are similarly geo-coded, medical information about an occupant in the property, special instructions for a caregiver at the property, and other pertinent information.

A step 640 now has the central clearinghouse computer 260 send a message to the user via at least one possible communication technique. This data is sent to the user's mobile terminal without intervention by the mobile user. The central clearinghouse computer can be programmed to send such message to the user's portable transponder, or to a secondary device, or to an electronic mail server. If desired, the central computer 260 could be programmed to send this message to all three of these communication channels, or to only two the three, or simply to just one of the three, as desired by the user's original set-up programming.

It should be noted that one type of information that might be sent to the portable transponder 100 and/or to the secondary device is a "feedback request," which is a survey tool (a questionnaire) that can be used by an electronic lockbox system 250 or 260 to gather more specific information about a property for sale from a "showing agent" who has visited that property with a potential customer. A "feedback response" message would be solicited by such a feedback request. The user (e.g., the showing agent) receives the feedback request message via e-mail, or through the wireless wide area network, and answers questions that are presented in the feedback questionnaire using a computer (possibly the portable transponder). Those answers are then sent to the central computer 260 as the feedback response message. This type of functionality of an electronic lockbox system is described in detail in a companion patent application, noted below, having a title, "ELECTRONIC LOCK BOX SYSTEM WITH INCENTIVIZED FEEDBACK."

The mobile terminal of step 640 could be the portable transponder 100 or a secondary portable computer 200, which is depicted in FIG. 3. Such a secondary portable computer would typically be carried by the user, in addition to also carrying the portable transponder 100. The advantage to using a secondary device is having a lowered power consumption at a portable transponder itself, as well as possibly having a simplified construction for the portable transponder, which can lower its cost.

As noted above, the secondary computer device would typically be a wireless device, such as a smart phone. It also could be a wireless laptop computer, if desired by the user.

Figure 8:
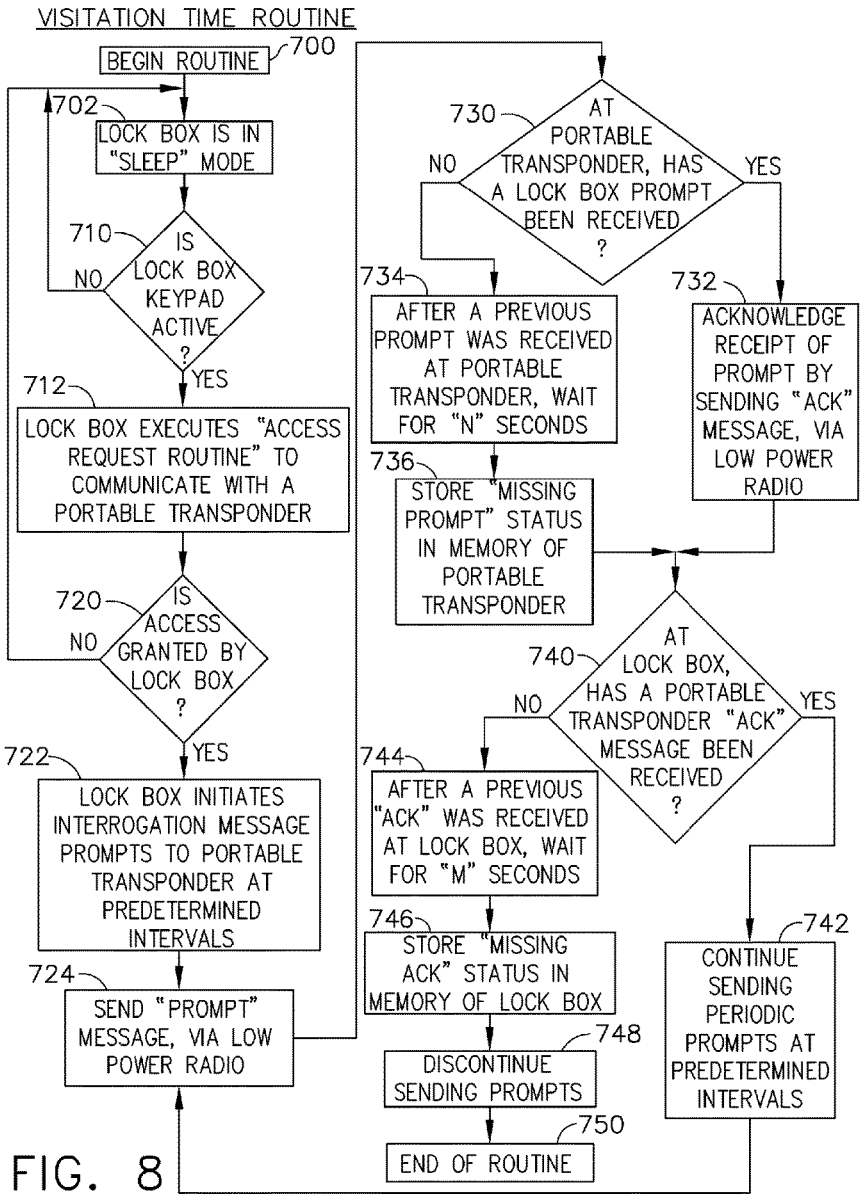
FIG. 8 is a flow chart of the steps performed by a visitation time routine, as used by the electronic lock box security system of FIG. 2 or FIG. 3.

The capabilities of having a portable transponder as described herein allow additional features to be implemented in an electronic lock box system. One advantageous feature is to provide the capability for tracking the approximate time in which a particular lock box system user is present at the property that has been secured by a particular lock box. Referring now to FIG. 8, a flow chart is provided to describe a "visitation time routine."

Upon activation of the electronic lock box keypad 14, and then after a successful response by a portable transponder 100 to the hail request generated by the lock box, the lock box 10 will begin transmitting regularly timed interrogation messages to the portable transponder to determine if the transponder is still within range. This is accomplished on FIG. 8, starting at the beginning of the routine at a step 700, then arriving at a step 702 in which the lock box is still in a "sleep" mode, by which the battery is in a low power state. This operating mode will change if the lock box keypad is activated.

At a decision step 710, the lock box device determines if its keypad is activated, by a user pressing one or more of its keys. If not, then the logic flow is directed back to step 702 and the lock box remains in its dormant or "sleep" state. On the other hand, if one of the keys of the keypad 14 has been depressed, then the logic flow is directed to a step 712, and the lock box then executes an "access request routine" to communicate with a portable transponder. This is a routine that is described in detail hereinabove, and is the subject of the flow chart of FIG. 4.

Figure 4:
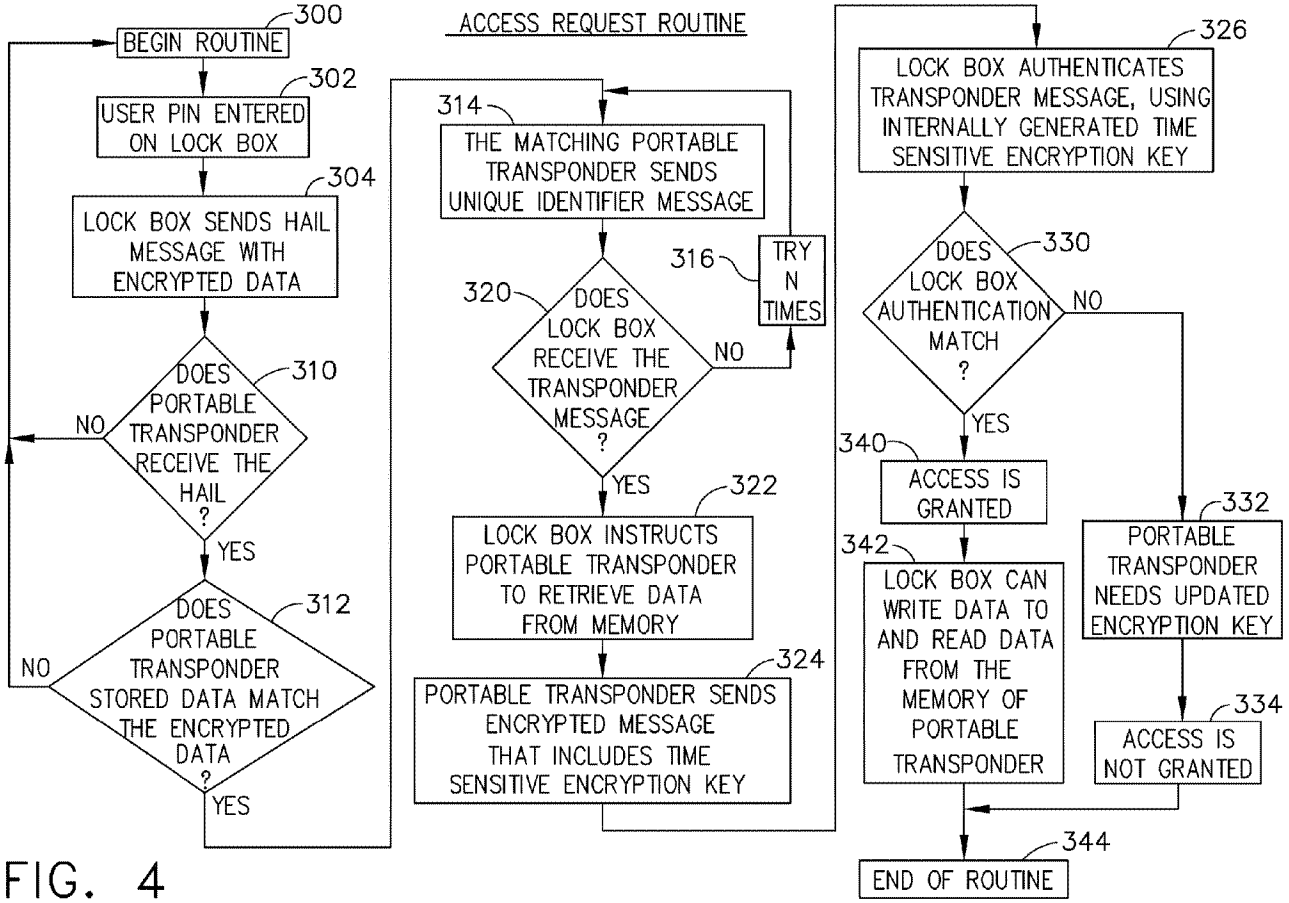
FIG. 4 is a flow chart of the steps performed by an access request routine, as used by the electronic lock box security system of FIG. 2 or FIG. 3.

As part of the access request routine of FIG. 4, the system eventually determines whether or not access should be granted by the lock box. On FIG. 8, this is depicted by a decision step 720, and if access is not to be granted by the lock box, then the logic flow is directed back to step 702, and the lock box goes back into its "sleep" mode until its keypad is once again activated. On the other hand, if access has been granted by the lock box, then the logic flow is directed through the YES output from step 720, and reaches a step 722.

At step 722, the electronic lock box initiates an interrogation message prompt (referred to herein as a "PROMPT message"), which is to be transmitted by its low power radio 27, and which will likely be received by a nearby portable transponder 100. Of course, this reception would occur only if the user who has been granted access to the lock box actually is carrying a portable transponder that has been the subject of the access request routine that is involved with the flow chart of FIG. 4, as noted above. The PROMPT message preferably will be a brief data stream that contains a specific identifier code for this particular electronic lock box 10, and/or a transaction code for this particular access event.

The first PROMPT message is followed by several more such PROMPT messages at predetermined time intervals. In general, it would be desired for periodic PROMPT messages to be sent by the lock box, and received by the portable transponder. The time interval between each PROMPT message could be, for example, as much as once every sixty seconds, or if desired, it could be shorter, such as once every twenty or thirty seconds, for example. This could be an optional setting that can be changed by the system administrator for particular real estate board, if desired. The PROMPT message is sent at a step 724, via the low power radio of the electronic lock box, as noted above.

If access had been granted for this particular electronic lock box, this specific portable transponder would have been aware of that, due to the logical functions of the access request routine of FIG. 4. After the portable transponder has become aware that access had been granted, the portable transponder will then be expecting to receive the PROMPT message from the lock box. A decision step 730 determines whether or not such a lock box PROMPT message has been received at the portable transponder. If so, then a step 732 acknowledges receipt of this PROMPT message by having the portable transponder send an acknowledgement message (referred to herein as an "ACK message"), via its low power radio 127. The electronic lock box will be expecting to receive this ACK message within a certain time period. The ACK message preferably will be a brief data stream that contains a specific identifier code for this specific portable transponder 100. Moreover, the ACK message could also contain an identifier code that was first created by the lock box 10, which acts as a transaction code for this specific occurrence of an access event.

On the other hand, if the portable transponder has not yet received the lock box PROMPT message at position step 730, then the logic flow is directed through its NO output to a step 734, where the portable transponder waits for a predetermined amount of time, referred to on FIG. 8 as "N" seconds. If the electronic lock box sends out the PROMPT messages at predetermined intervals of thirty seconds, then the portable transponder can expect to receive such PROMPT messages about every thirty seconds, and the value for N could be set to just over thirty seconds. (However, if the interval timing is programmable by a systems administrator so that the value of N could be in the range of 20-60 seconds, for example, then the value for N at the portable transponder might be hard-coded for just over 60 seconds, so that every portable transponder will work in every lock box system.)

If the portable transponder at decision step 730 has not yet received an PROMPT message from the lock box, and this status continues for more than N seconds at step 734, then the logic flow is directed to a step 736, where the portable transponder stores a "missing PROMPT" status in the memory of the portable transponder device (e.g., in non-volatile memory that could be part of the ROM memory 123 (such as in EEPROM) of the portable transponder 100). On the other hand, if the PROMPT message was actually received by the portable transponder in less than N seconds, then the output from decision block 730 would only travel through the YES branch to the step 732, and there would be no storing of the "missing PROMPT" status at this time in step 736.

If step 736 has been reached and a "missing PROMPT" status is stored in the memory of the portable transponder, the portable transponder will calculate a number of intervals in which it had received the PROMPT messages, and the number of PROMPT messages that were received will be related to the amount of real time that the portable transponder was within range of this particular electronic lock box. At part of step 736, this time calculation will be stored in the memory of the portable transponder, and it will be a close approximation to the amount of time for a "showing" of the property by a real estate agent (or the time of a "visitation" to the property by an authorized person, for other reasons).

It should be noted that an optional feature could be used in which the duration of the PROMPT message time intervals could be shortened under certain circumstances, to give more precision to the calculation of showing time, if desired. For example, the integral motion sensor of the portable transponder (i.e., motion sensor 156) could be used to validate that motion is occurring, and this information can be used by the portable transponder to generate its own interrogation message back to the lock box at a shorter time interval during such motion events. This can help to define with greater precision when the portable transponder and electronic lock box are within communication range, and when they first come out of communication range. This greater precision can then be used to more accurately determine the amount of time for the "showing" by the user of the property.

The logic flow from both steps 732 and 736 are directed to a decision step 740, which now determines at the lock box whether or not a portable transponder ACK message has been received. If so, then a step 742 is executed, which causes the lock box to continue sending the periodic PROMPT messages at the predetermined time interval. If that occurs, the logic flow is then directed to step 724 so that the lock box will continue to send the PROMPT message, via its low power radio.

On the other hand, if the electronic lock box 10 has not received an ACK message, then the logic flow from decision step 740 is directed through its NO output to a step 744, where the lock box 10 waits for a predetermined amount of time, referred to on FIG. 8 an "M" seconds. In many circumstances, the value of M will be set equal to the value of N (from step 734), although it need not necessarily be set to be exactly equal. Once this status continues for at least M seconds, the electronic lock box stores a "missing ACK" status in the memory of the lock box at step 746. This will preferably be stored in nonvolatile memory, such as the EEPROM memory 23 (see FIG. 1). Once that occurs, a step 748 will cause the lock box to discontinue sending the PROMPT messages, and the end of this routine will be reached at a step 750.

As part of the step 746 in which the lock box stores the missing ACK status, the electronic lock box will determine the approximate amount of time that occurred for the "showing" by the authorized user of this property to which the electronic lock box has been attached. The lock box 10 will keep track of the number of PROMPT messages that it has transmitted to the portable transponder during this specific access event, and since the lock box will also know the amount of time between each PROMPT message transmission, it will have the information necessary to calculate the real time of the showing event, according to when the portable transponder and lock box stopped communicating with each other. This calculated amount of time will be very close to the actual showing time spent by the user at the property. The user typically could be a real estate agent showing a property to a prospective buyer, or perhaps an authorized person visiting the property for another reason, such as a medical professional visiting a patient at the property.

In general, this system works to have the electronic lock box periodically send timed interrogation message and such messages will be acknowledged by a portable transponder that is within communication range, using the low power radios (which are both transmitters and receivers) in both the electronic lock box and the portable transponder. So long as the two devices continue to exchange data on a periodic basis, the event timing continues to advance. Once the communication loop ceases, typically due to the portable transponder moving out of communication range of the lock box, then both the lock box and the portable transponder will record in their respective memories the duration of the event during which the two devices were successful in exchanging the interrogation and acknowledgement messages. As noted above, the resolution of the timing (and thereby the accuracy of the system) can be affected by the interval of transmission of the interrogation messages, and if desired, this may be tuned by adjusting the interval period.

As an alternative, the electronic lock box could track the epoch time for both the beginning of the access event and the end of this routine, to provide a different way of tracking the showing time. The electronic lock box will know the epoch time when it began to send the PROMPT messages at step 722, and will also know the later epoch time when its step 740 determined that there has been no ACK message received within the appropriate time interval (as determined by step 744, by the value of M). These two epoch times could be subtracted from one another, and the difference value could be converted into real time minutes/seconds. The portable transponder could use a clock counter function in much the same manner, to provide its alternative way of tracking the showing time.

An optional, but perhaps necessary, feature of the visitation time routine of FIG. 8 will be to prevent adjacent lock boxes from affecting the timing of individual events at properties that are within close proximity to one another. To prevent this type of "crosstalk" between adjacent lock boxes, the optional function will cause a particular portable transponder to terminate an existing interrogation/acknowledgement loop from a first lock box that was visited by a user, once the portable transponder receives a hail attempt by a different (second) lock box. This will occur by the portable transponder refusing to acknowledge a further (existing) interrogation by the first lock box, once the hail attempt has been received from the second lock box. Once that occurs, then a new interrogation/acknowledgement loop will begin that involves the same portable transponder, but this time with the second lock box, and not the first.

A variety of radio communications schemes can be employed to improve accuracy and reduce the chance of false events. Examples of such schemes include clear channel assessment before transmitting an interrogation or acknowledgment, burst transmissions of repetitive frames of data to overcome spurious noise, and analysis of received signal strength in determining a cutoff for reliable timing.

The visitation time for each authorized access event can thus be stored in the memory of both the electronic lock box 10 and the portable transponder 100. This information can later be uploaded to a central computer (e.g., central clearinghouse computer 260) when a user communicates to such central computer at a later time, using the same transponder 100, or when a (perhaps different) user communicates to the central computer using a different portable transponder or a secondary computer 200, after the information was transferred from the particular lock box 10 to that secondary computer 200 or portable transponder 10. Alternatively, this information could be transferred from the lock box 10 to a secure memory device 70, and then later uploaded to the central computer when that memory device 70 has its memory contents read by the central computer.

It will be understood that the flow chart of FIG. 8 does not precisely represent the exact computer software executable code that typically would be used for these functions in the electronic lock box 10 and the portable transponder 100. In the first place, each device will operate as an individual entity, and FIG. 8 is portraying the two devices working together, as if they are virtually communicating with each other's processors at every step; in reality, the two devices must communicate with each other using messages that are transmitted and received through their respective radios and I/O interfaces 30 and 130. Such messages are treated by their receiving devices with the proper decrypting and authenticating functions, so long as the messages are formatted correctly and contain the proper encrypted to codings.

In the second place, most modern microprocessors are able to use multi-tasking software, or they can be interrupt driven, and thus able to perform portions of multiple functions out of a fixed sequence. In other words, one or more of their software routines could enter a "wait state" until certain conditions are satisfied, but their processors are not literally "stuck" once they reach a particular wait state, because their other "parallel" routines are still executing (as a multitasking processor should). Therefore, on FIG. 8, the control logic is not "stuck" at either step 734 or step 744 when no appropriate message has been immediately received. Instead, if a new appropriate message (a "PROMPT" or an "ACK") is indeed received, then the logic flow immediately shifts to step 732 or step 742, to continue sending further ACK messages or PROMPT messages, respectively.

It will be understood that the logical operations described in relation to the flow charts of FIGS. 4-8 can be implemented using sequential logic (such as by using microprocessor technology), or using a logic state machine, or perhaps by discrete logic; it even could be implemented using parallel processors. One preferred embodiment may use a microprocessor or microcontroller (e.g., the processor 16) to execute software instructions that are stored in memory cells within an ASIC. In fact, an entire microprocessor (or microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented.

It will also be understood that the precise logical operations depicted in the flow charts of FIGS. 4-8, and discussed above, could be somewhat modified to perform similar, although not exact, functions without departing from the principles of the technology disclosed herein. The exact nature of some of the decision steps and other commands in these flow charts are directed toward specific future models of lockbox systems (those involving lock boxes sold by SentriLock, LLC, for example) and certainly similar, but somewhat different, steps would be taken for use with other models or brands of lockbox systems in many instances, with the overall inventive results being the same.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

Some additional information about "basic" lock box embodiments, including advanced features, are more fully described in earlier patent documents by the same inventor, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. patent application Ser. No. 11/584,940, filed on Oct. 23, 2006 (Publication No. US 2007/0090921), for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. patent application Ser. No. 11/954,695, filed on Dec. 12, 2007 (Publication No. US 2008/0246587), for ELECTRONIC LOCK BOX WITH TRANSPONDER BASED COMMUNICATIONS; U.S. patent application Ser. No. 12/199,081, filed on Aug. 27, 2008 (Publication No. 2008/0309458), for ELECTRONIC LOCK BOX WITH TIME-RELATED DATA ENCRYPTION BASED ON USER-SELECTED PIN; U.S. patent application Ser. No. 12/128,038, filed on May 28, 2008 (Publication No. US 2009/0293562), for ELECTRONIC LOCK BOX WITH MECHANISM IMMOBILIZER FEATURES; and U.S. patent application Ser. No. 12/756,741 filed on Apr. 8, 2010, for ELECTRONIC LOCK BOX SYSTEM WITH INCENTIVIZED FEEDBACK. These patent documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A method for operating an electronic lock box system, said method comprising:

(a) providing an electronic lock box having a first processing circuit, a first memory circuit, a first short range wireless communications [device] *transmitter and receiver*, a secure compartment having a movable opening element that is under the control of said first processing circuit, and a first *user operated* data input [device] *circuit*:

(i) periodically inspecting said first *user operated* data input [device] *circuit* to determine if it has been activated, and if so, determining a first input data value that is entered thereon by a user;

(ii) retrieving data stored in said first memory circuit, including a unique to lockbox identifier value;

(iii) constructing a hail message from said unique lockbox identifier value and from said first input data value, and transmitting said hail message using said first short range wireless communications [device] *transmitter and receiver*; and (b) providing a portable transponder having a second processing circuit, a second memory circuit, and a second short range wireless communications [device] *transmitter and receiver*:

(i) retrieving data stored in said second memory circuit, including a user identifier data value; and (ii) determining if said second short range wireless communications [device] *transmitter and receiver* has received said hail message from said electronic lock box; and if so, based upon said user identifier data value, determining if said hail message contains information corresponding to the identity of said user;

(c) if said received hail message corresponds to the identity of said user, then at said portable transponder:

(i) retrieving data stored in said second memory circuit, including a second time sensitive encryption key value;

(ii) executing a second data encryption routine that uses said second time sensitive encryption key value and applies it to said user identifier data value, thereby creating a second encrypted data message;

(iii) transmitting a response message that includes said second encrypted data message, using said second short range wireless communications [device] *transmitter and receiver*; and (d) at said electronic lock box:

(i) determining if said first short range wireless communications [device] *transmitter and receiver* has received said response message from said portable transponder, and if so:

(ii) retrieving data stored in said first memory circuit, including a first time sensitive encryption key value;

(iii) executing a first data decryption routine that uses said first time sensitive encryption key value and applies it to said response message, thereby generating a first identifier code value; and (iv) comparing said first identifier code value to said first input data value, and if there is a match, then granting access to said secure compartment of the electronic lock box.

2. The method of claim 1, wherein said hail message is encrypted, and said portable transponder executes a routine to decrypt said hail message to determine said first input data value before it was encrypted by said electronic lock box.

3. The method of claim 2, wherein said step of determining if said hail message corresponds to the identity of a user requires said unencrypted first input data value to be equal to said user identifier data value to find a match.

4. The method of claim 1, further comprising the steps of: (a) automatically updating, at said electronic lock box, a value of said first time sensitive encryption key value based on the passage of time; and (b) if said second time sensitive encryption key value has been updated on said portable transponder within a predetermined amount of real time, then a value of said second time sensitive encryption key value will sufficiently correlate to a present value of said first time sensitive encryption key value such that, if said first input data value is equal to said user identifier data value, then access to said secure compartment of the electronic lock box will be granted.

5. The method of claim 4, further comprising the steps of:

(a) if access was granted, sending access event data from said electronic lock box to said portable transponder, using said first short range wireless communications [device] *transmitter and receiver* and using said second short range wireless communications [device] *transmitter and receiver*, and storing said access event data in said second memory circuit.

6. The method of claim 5, further comprising the steps of:

(a) providing said portable transponder with a wide area network wireless communications [device] *transmitter and receiver* that acts as a first wireless data link;

(b) providing a remote central computer that includes a system database and a second wireless data link; and (c) if access was granted to said secure compartment of the electronic lock box, then uploading said access event data from said portable transponder to said central computer, and storing the access event data in said system database.

7. The method of claim 6, further comprising the steps of:

(a) providing said portable transponder with a display for showing visible information to said user;

(b) determining, by said central computer, if there is existing data stored at the central computer that is to be shared with said user, in which said existing data corresponds to a property where said electronic lock box is sited; and (c) if so, transmitting said existing data to said portable transponder, and showing said existing data on said display.

8. The method of claim 5, wherein said second memory circuit comprises a portable secure memory [device] *circuit* that is removable from said portable transponder.

9. The method of claim 1, further comprising the steps of:

(a) automatically updating, at said electronic lock box, a value of said first time sensitive encryption key value based on the passage of time; and (b) if said second time sensitive encryption key value has not been updated on said portable transponder within a predetermined amount of time, then a value of said second time sensitive encryption key value will not sufficiently correlate to a present value of said first time sensitive encryption key value such that, even if said first input data value is equal to said stored user identifier data value, access to said secure compartment of the electronic lock box will not be granted.

10. The method of claim 9, further comprising the steps of:

(a) providing said portable transponder with a wide area network wireless communications [device] *transmitter and receiver* that acts as a first wireless data link;

(b) providing a remote central computer that includes a system database and a second wireless data link;

(c) if access was not granted to said secure compartment of the electronic lock box, then transmitting an update request from said portable transponder to said central computer, and downloading an updated encryption key from said central computer to said portable transponder, in real time; and (d) using the received updated encryption key as said second time sensitive encryption key value, so as to obtain access to said secure compartment of the electronic lock box.

11. A method for operating an electronic lock box system, said method comprising: (a) providing a central computer that includes a first processing circuit, a first memory circuit, a system database, and a first wireless data link; and (b) providing a portable transponder having a second processing circuit, a second memory circuit, a motion sensor, and a wide area network wireless communications [device] *transmitter and receiver* that acts as a second wireless data link; (i) maintaining said wide area network wireless communications [device] *transmitter and receiver* in a low power state during inactive periods when a user is not handling said portable transponder; (ii) activating said wide area network wireless communications [device] *transmitter and receiver* if said motion sensor provides an input state indicating that said portable transponder is being handled by said user; and (iii) determining if said portable transponder has a need to communicate with said central computer, and if so, transmitting identification data to said central computer using said wide area network wireless communications [device] *transmitter and receiver*;

wherein said step of determining if said portable transponder has a need to communicate with said central computer occurs if at least one of the following states exists: (a) said portable transponder requires an updated time sensitive encryption key; (b) said second memory circuit of the portable transponder contains at least one access event data set pertaining to a system electronic lock box that is to be stored in said database of the central computer; and (c) said second memory circuit of the portable transponder contains at least one feedback response data set pertaining to a system electronic lock box that is to be stored in said database of the central computer.

12. The method of claim 11, further comprising the steps of:

(a) determining, by said central computer, if there is existing data stored at the central computer that is to be downloaded to said portable transponder, in which said existing data pertains to a property, or pertains to system electronic lock box; and if so (b) transmitting said existing data to at least one of:

(i) said portable transponder, using said first wireless data link; and (ii) said user, using electronic mail.

13. The method of claim 12, wherein said existing data comprises at least one of:

(a) an updating time sensitive encryption key value;

(b) a feedback request;

(c) a local alarm system code;

(d) sales information pertaining to said property;

(e) medical information about an occupant in said property; and (f) special instructions for a caregiver at said property.

14. An electronic lock box system, comprising:

(a) an electronic lock box having a first processing circuit, a first memory circuit, a first short range wireless communications [device] *transmitter and receiver*, a secure compartment having a movable opening element that is under the control of said first processing circuit, and a first *user operated* data input [device] *circuit*, wherein said electronic lock box *is configured to* generally [maintains] *maintain* said first short range wireless communications [device] *transmitter and receiver* in a sleep mode until becoming activated by user manipulation of said first *user operated* data input [device] *circuit*, and once activated, said first short range wireless communications [device transmits] *transmitter and receiver is configured to transmit* a hail message; and (b) a portable transponder having a second processing circuit, a second memory circuit, a second short range wireless communications [device] *transmitter and receiver*, a second *user operated* data input [device] *circuit* for use by said user, and a motion sensor, wherein said portable transponder *is configured to* generally [maintains] *maintain* said second short range wireless communications [device] *transmitter and receiver* in a sleep mode until becoming activated by said motion sensor undergoing a change in state indicating that said portable transponder is being handled by said user, and once activated, said second short range wireless communications [device receives] *transmitter and receiver is configured to receive* said hail message and acts upon it;

(c) an attachable/detachable portable secure memory [device] *circuit* having a plurality of memory elements;

(d) mounted to said electronic lock box, a first data interface [for communicating] *circuit is configured to communicate* with said plurality of memory elements of the portable secure memory [device] *circuit*, if said portable secure memory [device] *circuit* is attached to said electronic lock box; and (e) mounted to said portable transponder, a second data interface [for communicating] *circuit is configured to communicate* with said plurality of memory elements of the portable secure memory [device] *circuit*, if said portable secure memory [device] *circuit* is attached to said portable transponder.

15. The electronic lock box system of claim 14, wherein said a second memory circuit includes a removable portable secure memory [device] *circuit* that includes a plurality of memory elements for storing data, including time-sensitive data.

16. The electronic lock box system of claim 14, wherein said second processing circuit is configured:

(a) to determine if said hail message was received from a correct user of said electronic lock box, and if so;

(b) to transmit, using said second short range wireless communications [device] *transmitter and receiver*, a response message that contains a second user identification value and a second time sensitive encryption key value.

17. The electronic lock box system of claim 16, wherein said first processing circuit is configured:

(a) to retrieve a first user identification value from said first *user operated* data input [device] *circuit*, and a first time sensitive encryption key value that is current with respect to real time;

(b) to determine if said response message contains a proper said second user identification value and a proper second time sensitive encryption key value, by using said first user identification value and using said first time sensitive encryption key value; and (c) if the response message contains proper data, then to grant access to said secure compartment.

18. The electronic lock box system of claim 17, wherein if access was granted, then said first processing circuit is further configured: (a) to generate access event data; and (b) to transmit, using said first short range wireless communications [device] *transmitter and receiver*, said access event data to said portable transponder.

19. The electronic lock box system of claim 18, further comprising:

(a) at said portable transponder, a wide area network wireless communications [device] *transmitter and receiver* that acts as a first wireless data link; and (b) a remotely located central computer that includes a system database and a second wireless data link;

wherein:

(c) said second processing circuit is configured to upload said access event data from said portable transponder to said central computer, by use of said wide area network wireless communications [device] *transmitter and receiver*; and (d) said central computer is configured to store the access event data in said system database.

20. The electronic lock box system of claim 19, wherein:

(a) if access was not granted, then said second processing circuit is further configured to transmit an update request from said portable transponder to said central computer; and (b) said central computer is configured to download an updated encryption key from said central computer to said portable transponder, in real time; and (c) said second processing circuit is further configured to transmit the received updated encryption key as said second time sensitive encryption key value, so as to obtain access to said secure compartment of the electronic lock box.

21. An electronic lock box system, comprising:

(a) a first electronic lock box having a first processing circuit, a first memory circuit, a first short range wireless communications [device] *transmitter and receiver*, and a secure compartment having a movable opening element that is under the control of said first processing circuit, wherein once said first electronic lock box becomes activated, said first short range wireless communications [device transmits] *transmitter and receiver is configured to transmit* a first hail message; and (b) a portable transponder having a second processing circuit, a second memory circuit, and a second short range wireless communications [device] *transmitter and receiver*, wherein once said second short range wireless communications [device] *transmitter and receiver* receives said first hail message, said portable transponder [sends] *is configured to send* a response message to authenticate itself to said first electronic lock box;

(c) after said first electronic lock box receives said response message, [and verifies that it] *said first electronic lock box is configured to verify that said response message* is authentic, *and if so,* said first short range wireless communications [device begins] *transmitter and receiver is configured to begin* to periodically transmit a PROMPT message at predetermined intervals;

(d) if said portable transponder is within range, said second short range wireless communications [device transmits] *transmitter and receiver is configured to transmit* an ACK message each time said portable transponder receives said periodic PROMPT message;

(e) thereafter, said portable transponder, under control of said second processing circuit, [waits] *is configured to wait* for N seconds, and if no further periodic PROMPT message is received during said N seconds waiting interval, then said second processing circuit [determines] *is configured to determine* that a "missing PROMPT" status is in effect; and (f) said first electronic lock box, under control of said first processing circuit, [waits] *is configured to wait* for M seconds, and if no ACK message is received during said M seconds waiting interval, then said first processing circuit [determines] *is configured to determine* that a "missing ACK" status is in effect.

22. The electronic lock box system of claim 21, wherein said first electronic lock box [tracks] *is configured to track* a number of times said periodic PROMPT message is sent until said missing ACK status is in effect, and [stores] *to store* that number in said first memory circuit.

23. The electronic lock box system of claim 22, wherein after said first processing circuit determines that a missing ACK status is in effect, said first short range wireless communications [device discontinues] *transmitter and receiver is configured to discontinue* transmitting said periodic PROMPT message.

24. The electronic lock box system of claim 21, wherein said portable transponder [tracks] *is configured to track* a number of times said periodic PROMPT message is received until said missing PROMPT status is in effect, and [stores] *to store* that number in said second memory circuit.

25. The electronic lock box system of claim 21, further comprising a first timing clock at said first electronic lock box, which [determines] *is configured to determine* a first timing value when said first short range wireless communications [device] *transmitter and receiver* begins to transmit said periodic PROMPT message, and [determines] *to determine* a second timing value when said first processing circuit determines that a missing ACK status is in effect, and [determines] *to determine* a first difference between said first and second timing values and [stores] *to store* said first difference in said first memory circuit.

26. The electronic lock box system of claim 25, wherein after said first processing circuit determines that a missing ACK status is in effect, said first short range wireless communications [device discontinues] *transmitter and receiver is configured to discontinue* transmitting said periodic PROMPT message.

27. The electronic lock box system of claim 21, further comprising a second timing clock at said portable transponder, which [determines] *is configured to determine* a third timing value when said second short range wireless communications [device] *transmitter and receiver* begins to receive said periodic PROMPT message, and [determines] *to determine* a fourth timing value when said second processing circuit determines that a missing PROMPT status is in effect, and [determines] *to determine* a second difference between said third and fourth timing values and [stores] *to store* said second difference in said second memory circuit.

28. The electronic lock box system of claim 21, further comprising a second electronic lock box having a third processing circuit, a third memory circuit, a third short range wireless communications [device] *transmitter and receiver*, and a second secure compartment having a movable opening element that is under the control of said third processing circuit, wherein once said second electronic lock box becomes activated, said third short range wireless communications [device transmits] *transmitter and receiver is configured to transmit* a second hail message;

if said portable transponder receives said second hail message, then said portable transponder [terminates] *is configured to terminate* sending further ACK messages to said first electronic lock box, even if said portable transponder is still receiving said periodic PROMPT message from said first electronic lock box, and instead said portable transponder [sends] *is configured to send* a second response message to authenticate itself to said second electronic lock box.

*29. An electronic lock box system, comprising:*

*(a) a first electronic lock box having a first processing circuit, a first memory circuit, a first short range wireless communications transmitter and receiver, and a secure compartment having a movable opening element that is under the control of said first processing circuit, wherein once said first electronic lock box becomes activated, said first short range wireless communications transmitter and receiver is configured to transmit a first hail message; and*

*(b) a portable transponder having a second processing circuit, a second memory circuit, and a second short range wireless communications transmitter and receiver, wherein once said second short range wireless communications transmitter and receiver receives said first hail message, said portable transponder is configured to send a response message to authenticate itself to said first electronic lock box;*

*(c) after said first electronic lock box receives said response message, said first electronic lock box is configured to verify that said response message is authentic, and if so, said first short range wireless communications transmitter and receiver is configured to begin to periodically transmit a PROMPT message at predetermined intervals;*

*(d) if said portable transponder is within range, said second short range wireless communications transmitter and receiver of said portable transponder is configured to receive said periodic PROMPT message;*

*(e) thereafter, said portable transponder, under control of said second processing circuit, is configured to wait for N seconds, and if no further periodic PROMPT message is received during said N seconds waiting interval, then said second processing circuit is configured to determine that a "missing PROMPT" status is in effect.*

*30. The electronic lock box system of claim 29, wherein said portable transponder is configured to track a number of times said periodic PROMPT message is received until said missing PROMPT status is in effect, and to store that number in said second memory circuit.*

*31. The electronic lock box system of claim 29, wherein after said second processing circuit determines that a "missing PROMPT" status is in effect, said portable transponder is configured to store that missing PROMPT status in said second memory circuit.*

*32. The electronic lock box system of claim 29, wherein said portable transponder is configured to track a number of times said periodic PROMPT message is received until said missing PROMPT status is in effect, and to convert that tracked number into units of real time.*

*33. The electronic lock box system of claim 29, wherein said portable transponder is configured to track a number of times said periodic PROMPT message is received until said missing PROMPT status is in effect, and said tracked number represents a visitation time during a showing of a property at which said first electronic lock box is sited.*

*34. The electronic lock box system of claim 29, further comprising a motion sensor with said portable transponder, said motion sensor being used to help said portable transponder define with greater precision an amount of time for a showing during the interval between: (a) said reception of a first periodic PROMPT message received from said first electronic lock box, and (b) said missing PROMPT status is in effect.*

*35. An electronic lock box system, comprising:*

*(a) a first electronic lock box having a first processing circuit, a first memory circuit, a first input/output interface circuit, a first short range wireless communications transmitter and receiver, and a secure compartment having a movable opening element that is under the control of said first processing circuit, said first input/output interface circuit providing signal pathways between at least two of said first processing circuit, said first memory circuit, said first short range wireless communications transmitter and receiver, and said movable opening element of the secure compartment;*

*characterized in that, once said first electronic lock box becomes activated, said first short range wireless communications transmitter and receiver is configured to transmit a first hail message; and*

*(b) a portable transponder having a second processing circuit, a second memory circuit, a second input/output interface circuit, and a second short range wireless communications transmitter and receiver, said second input/output interface circuit providing signal pathways between at least two of said second processing circuit, said second memory circuit and said second short range wireless communications transmitter and receiver;*

*characterized in that, once said second short range wireless communications transmitter and receiver receives said first hail message, said portable transponder is configured to send a response message to authenticate itself to said first electronic lock box;*

*(c) after said first electronic lock box receives said response message, said first electronic lock box is configured to verify that said response message is authentic, and if so, said first short range wireless communications transmitter and receiver is configured to begin to periodically transmit a PROMPT message at predetermined intervals;*

*(d) if said portable transponder is within range, said second short range wireless communications transmitter and receiver of said portable transponder is configured to receive said periodic PROMPT message;*

*(e) thereafter, said portable transponder, under control of said second processing circuit, is configured to wait for N seconds, and if no further periodic PROMPT message is received during said N seconds waiting interval, then said second processing circuit is configured to determine that a "missing PROMPT" status is in effect.*

*36. The electronic lock box system of claim 35, wherein said portable transponder is configured to track a number of times said periodic PROMPT message is received until said missing PROMPT status is in effect, and said tracked number represents a visitation time during a showing of a property at which said first electronic lock box is sited.*

*37. A method for operating an electronic lock box system, said method comprising:*

(*a*) *providing a first electronic lock box having a first processing circuit, a first memory circuit, a first input/output interface circuit, a first short range wireless communications transmitter and receiver, and a secure compartment having a movable opening element that is under the control of said first processing circuit:*

(*i*) *activating said first electronic lock; and*

(*ii*) *transmitting a first hail message, using said first short range wireless communications transmitter and receiver;*

(*b*) *providing a portable transponder having a second processing circuit, a second memory circuit, a second input/output interface circuit, and a second short range wireless communications transmitter and receiver:*

(*i*) *receiving said first hail message at said second short range wireless communications transmitter and receiver; and*

(*ii*) *sending, by said portable transponder, a response message to authenticate itself to said first electronic lock box;*

(*c*) *at said first electronic lock box:*

(*i*) *receiving said response message;*

(*ii*) *verifying that said response message is authentic; and if so*

(*iii*) *periodically transmit a PROMPT message at predetermined intervals, using said first short range wireless communications transmitter and receiver; and*

(*d*) *at said portable transponder:*

(*i*) *if said portable transponder is within range, receiving said periodic PROMPT message, using said second short range wireless communications transmitter and receiver; and*

(*ii*) *thereafter, waiting for N seconds, and if no further periodic PROMPT message is received during said N seconds waiting interval; then*

(*iii*) *determining that a "missing PROMPT" status is in effect.*

*38. The method of claim 37, further comprising the steps of:*

(*a*) *tracking a number of times said periodic PROMPT message is received at said portable transponder until said missing PROMPT status is in effect; and*

(*b*) *using said tracked number, determining a visitation time during a showing of a property at which said first electronic lock box is sited.*

* * * * *